United States Patent
Nakasaku et al.

(10) Patent No.: US 7,324,819 B2
(45) Date of Patent: Jan. 29, 2008

(54) COMMUNICATION TERMINAL, AND COMMUNICATION COMPUTER PROGRAM PRODUCT

(75) Inventors: Yukiyoshi Nakasaku, Kawasaki (JP); Hiroshi Takano, Kawasaki (JP); Hitoshi Nakanishi, Kawasaki (JP); Yasuyuki Sayama, Kawasaki (JP); Yuichi Tashiro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 16 days.

(21) Appl. No.: 10/899,293

(22) Filed: Jul. 26, 2004

(65) Prior Publication Data

US 2005/0197127 A1  Sep. 8, 2005

(30) Foreign Application Priority Data

Mar. 5, 2004  (JP) .............................. 2004-062054

(51) Int. Cl.
*H04Q 7/20* (2006.01)

(52) U.S. Cl. ................ 455/445; 455/422.1; 455/67.11; 455/513; 455/517; 370/216; 370/238; 370/351; 370/338

(58) Field of Classification Search ................ 455/445, 455/422.1, 518, 519, 421, 226.1, 226.2, 67.11, 455/513, 517; 370/328–338, 216, 238, 251, 370/254, 351
See application file for complete search history.

(56) References Cited

U.S. PATENT DOCUMENTS 6,535,498 B1 * 3/2003 Larsson et al. ............. 370/338
6,965,568 B1 * 11/2005 Larsen ....................... 370/238
2006/0165025 A1 * 7/2006 Singh et al. ................ 370/315

FOREIGN PATENT DOCUMENTS

JP  2001-7762  1/2001

* cited by examiner

*Primary Examiner*—Rafael Perez-Gutierrez
*Assistant Examiner*—Khai Nguyen
(74) *Attorney, Agent, or Firm*—Greer, Burns & Crain, Ltd.

(57) ABSTRACT

A communication terminal has an acquiring unit configured to acquire information related to a strength of a radio wave received, a selecting unit configured to select a data communication route based on the information acquired by the acquiring unit, and a storage unit configured to store information related to the data communication route selected by the selecting unit. The communication terminal is configured to perform wireless communication based on the information related to the data communication route.

11 Claims, 17 Drawing Sheets

FIG.3

ROUTING TABLE FOR TERMINAL A (30)

| DESTINATION TERMINAL | NUMBER OF TRANSFERS | FIRST TRANSFER DESTINATION TERMINAL | FIELD STRENGTH OF FIRST TRANSFER DESTINATION TERMINAL | FIELD STRENGTH OF OWN TERMINAL | DATA TRANSMISSION POWER |
|---|---|---|---|---|---|
| A | 0 | — | — | — | — |
| B | 1 | B | h | g | k |
| C | 2 | D | b | a | k |
| D | 1 | D | b | a | k |
| E | 3 | D | b | a | k |

ROUTING TABLE FOR TERMINAL B (31)

| DESTINATION TERMINAL | NUMBER OF TRANSFERS | FIRST TRANSFER DESTINATION TERMINAL | FIELD STRENGTH OF FIRST TRANSFER DESTINATION TERMINAL | FIELD STRENGTH OF OWN TERMINAL | DATA TRANSMISSION POWER |
|---|---|---|---|---|---|
| A | 1 | A | g | h | l |
| B | 0 | — | — | — | — |
| C | 1 | C | j | i | m |
| D | 2 | C | j | i | m |
| E | 2 | C | j | i | m |

ROUTING TABLE FOR TERMINAL C (32)

| DESTINATION TERMINAL | NUMBER OF TRANSFERS | FIRST TRANSFER DESTINATION TERMINAL | FIELD STRENGTH OF FIRST TRANSFER DESTINATION TERMINAL | FIELD STRENGTH OF OWN TERMINAL | DATA TRANSMISSION POWER |
|---|---|---|---|---|---|
| A | 2 | B | i | j | n |
| B | 1 | B | i | j | n |
| C | 0 | — | — | — | — |
| D | 1 | D | c | d | p |
| E | 1 | E | f | e | q |

ROUTING TABLE FOR TERMINAL D (33)

| DESTINATION TERMINAL | NUMBER OF TRANSFERS | FIRST TRANSFER DESTINATION TERMINAL | FIELD STRENGTH OF FIRST TRANSFER DESTINATION TERMINAL | FIELD STRENGTH OF OWN TERMINAL | DATA TRANSMISSION POWER |
|---|---|---|---|---|---|
| A | 1 | A | a | b | r |
| B | 2 | A | a | b | r |
| C | 1 | C | d | c | s |
| D | 0 | — | — | — | — |
| E | 2 | C | d | c | t |

ROUTING TABLE FOR TERMINAL E (34)

| DESTINATION TERMINAL | NUMBER OF TRANSFERS | FIRST TRANSFER DESTINATION TERMINAL | FIELD STRENGTH OF FIRST TRANSFER DESTINATION TERMINAL | FIELD STRENGTH OF OWN TERMINAL | DATA TRANSMISSION POWER |
|---|---|---|---|---|---|
| A | 3 | C | e | f | u |
| B | 2 | C | e | f | u |
| C | 1 | C | e | f | u |
| D | 2 | C | e | f | u |
| E | 0 | — | — | — | — |

FIG.4

| SENDER TERMINAL | | | B |
|---|---|---|---|
| DESTINATION TERMINAL | 1 | TERMINAL NAME | A |
| | | NUMBER OF TRANSFERS | 2 |
| | | FIELD STRENGTH | g |
| | 2 | TERMINAL NAME | B |
| | | NUMBER OF TRANSFERS | 1 |
| | | FIELD STRENGTH | – |
| | 3 | TERMINAL NAME | C |
| | | NUMBER OF TRANSFERS | 2 |
| | | FIELD STRENGTH | j |
| | 4 | TERMINAL NAME | D |
| | | NUMBER OF TRANSFERS | 3 |
| | | FIELD STRENGTH | – |
| | 5 | TERMINAL NAME | E |
| | | NUMBER OF TRANSFERS | 3 |
| | | FIELD STRENGTH | – |

FIG.5

| ID | 1028 |
|---|---|
| DESTINATION TERMINAL | E |
| SENDER TERMINAL | A |
| NUMBER OF HOPS | 3 |
| DATA | ****** |

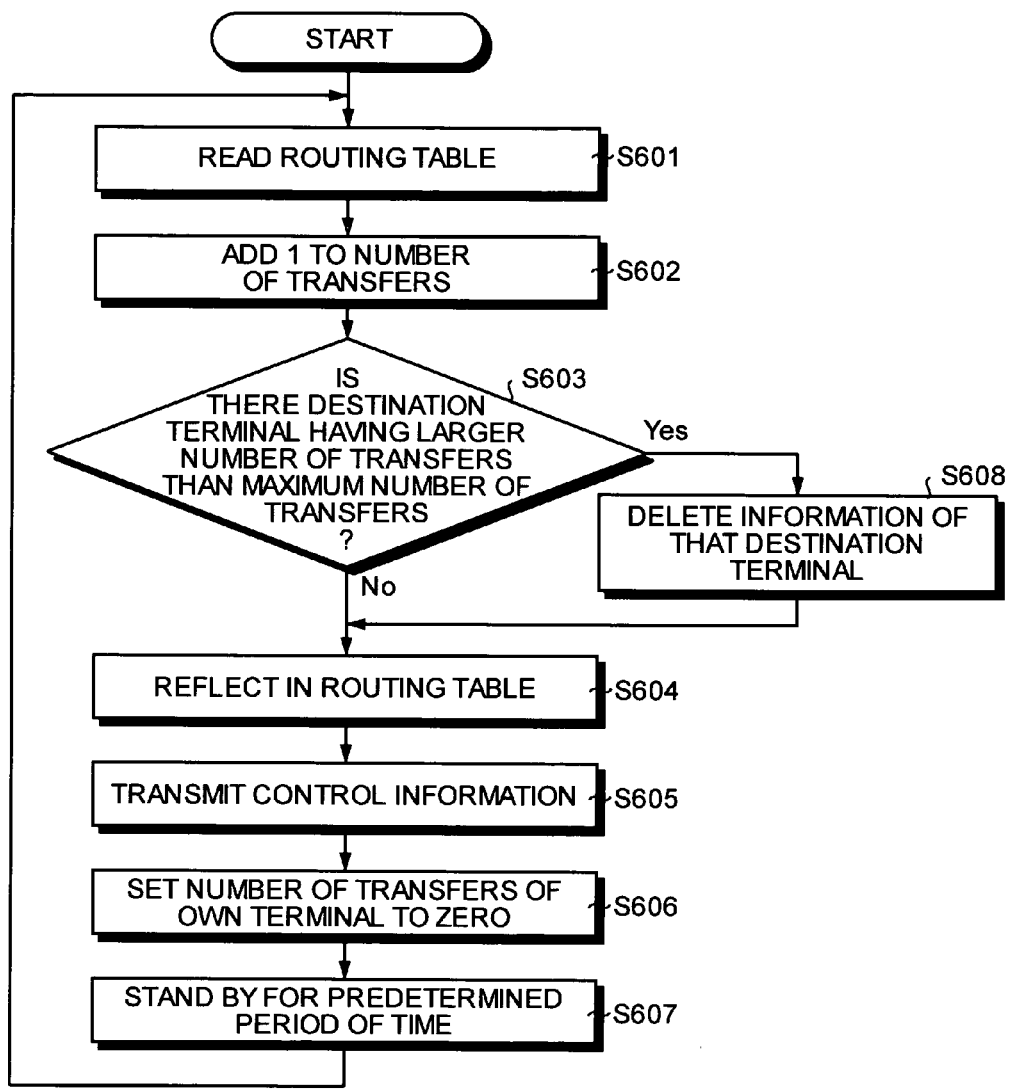

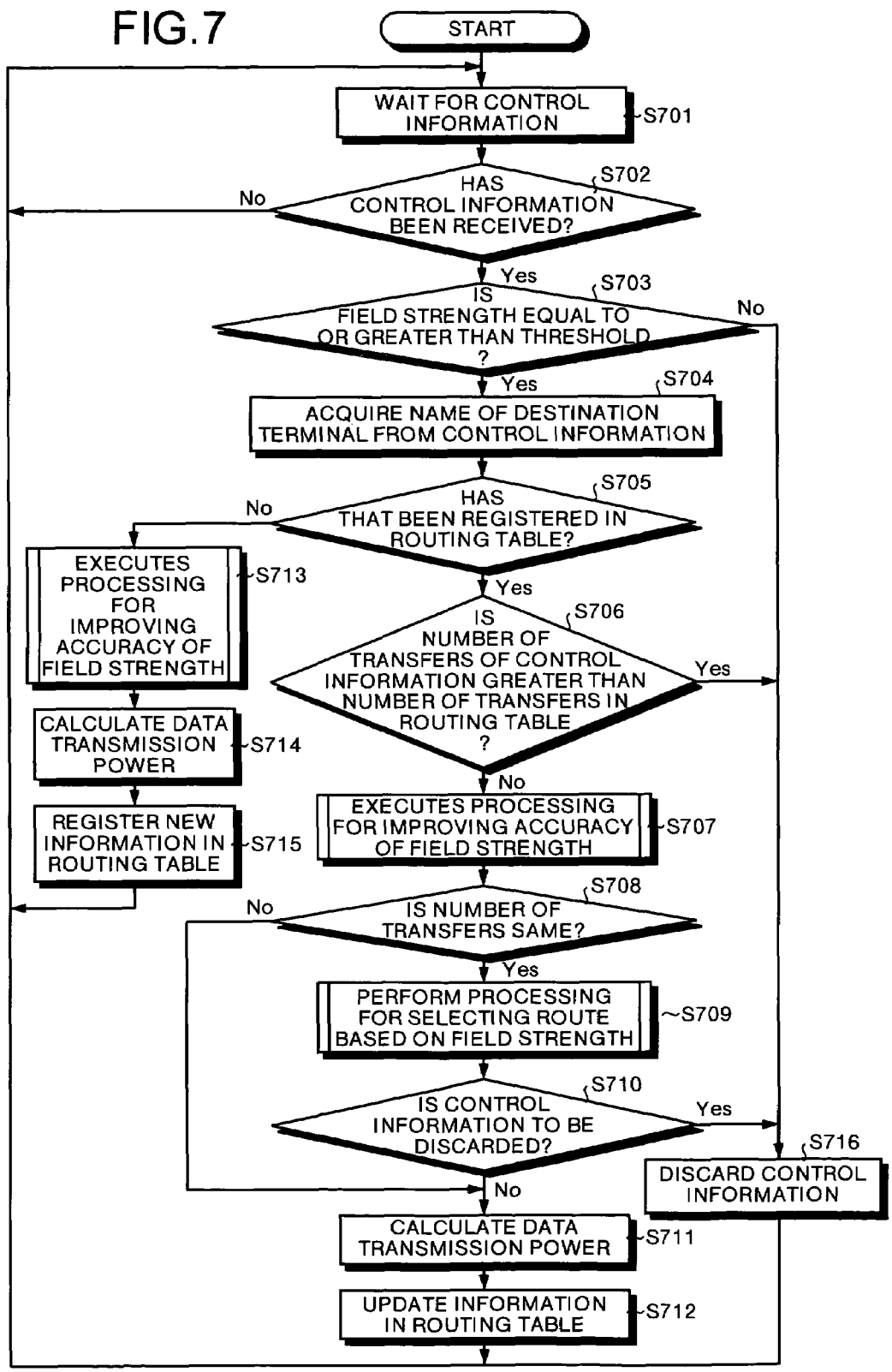

COMMUNICATION TERMINAL, AND COMMUNICATION COMPUTER PROGRAM PRODUCT

BACKGROUND OF THE INVENTION

1) Field of the Invention

The present invention relates to a communication terminal that performs wireless communication based on the information related to a data communication route, a communication program, and a computer readable recording medium having recorded the communication program therein. More specifically, the present invention relates to a communication terminal that can select an optimum data communication route, even when there are multiple data communication routes, a communication program, and a computer readable recording medium having recorded the communication program therein.

2) Description of the Related Art

There is conventionally a technique for performing data transfer via an ad hoc network configured by communication terminals that can be interconnected by radio, without depending on an infrastructure such as a base station.

The respective communication terminals connected to the ad hoc network have a function of relaying data addressed to other communication terminals. Therefore, even if the distance to a communication terminal, being a destination of the data, is too far for the radio wave to reach, and hence the data cannot be transmitted directly, since many communication terminals relay the data, the data can be transmitted to the communication terminal, being the destination.

As one example of the communication terminal connected to such an ad hoc network, the Japanese Patent Application Laid-Open No. 2001-7762 discloses a controller, which increases the transmission power level of the own terminal device, when a communication terminal transmits a request for detecting a data transmission route, and as a response thereto, receives a detection error signal, to increase the range capable of wireless communication, thereby retransmitting the request for detecting the data transmission route.

However, in the conventional technique in the Patent Application, the range capable of wireless communication is simply increased to search a route capable of transmitting data, which cannot select an optimum route when there are multiple routes.

That is, in order to transmit data efficiently, it is necessary to narrow down to an optimum route from the routes. However, when the range capable of wireless communication is expanded as in the conventional art in the Patent Literature 1, many data transmission routes are generated. As a result, it becomes difficult to select the optimum route.

SUMMARY OF THE INVENTION

It is an object of the present invention to solve at least the problems in the conventional technology.

A communication terminal according to an aspect of the present invention includes an acquiring unit configured to acquire information related to a strength of a radio wave received; a selecting unit configured to select a data communication route based on the information acquired by the acquiring unit; and a storage unit configured to store information related to the data communication route selected by the selecting unit, wherein the communication terminal is configured to perform wireless communication based on the information related to the data communication route.

A computer program product according to another aspect of the present invention for performing wireless communication, includes computer executable instructions stored on a computer readable medium, wherein the instructions, when executed by a computer, cause the computer to perform: acquiring information related to a strength of a radio wave received; selecting a data communication route based on the information acquired; storing information related to the data communication route selected; and performing wireless communication based on the information related to the data communication route.

The other objects, features, and advantages of the present invention are specifically set forth in or will become apparent from the following detailed description of the invention when read-in conjunction with the accompanying drawings.

BRIEF DESCRIPTION OF THE DRAWINGS

FIG. 3 is a routing table of respective communication terminals;

FIG. 4 is one example of data structure of control information;

FIG. 5 is one example of data structure of transmission data;

FIG. 6 is a flowchart for explaining a processing procedure for a communication terminal to transmit control information;

FIG. 7 is a flowchart for explaining a processing procedure for the communication terminal to create and update the routing table;

DETAILED DESCRIPTION

Exemplary embodiments of the present invention will be explained in detail below with reference to the accompanying drawings. In the embodiments, an instance when the present invention is applied to an ad hoc network, being one kind of radio networks, will be explained.

Figure 1:
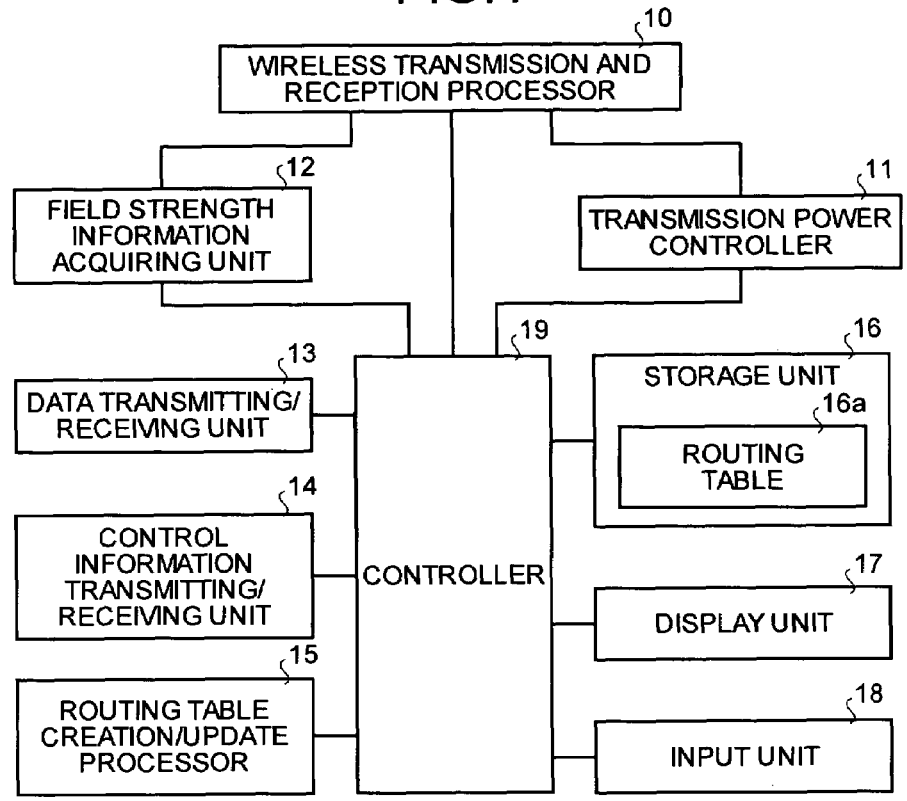
FIG. 1 is a block diagram of the functional configuration of a communication terminal according to a first embodiment.

The functional configuration of a communication terminal according to the embodiment will be explained first. FIG. 1 is a block diagram of the functional configuration of the communication terminal according to the first embodiment. This communication terminal is a terminal device such as a personal computer that can be interconnected by radio, personal digital assistants (PDA), a mobile phone, and a radio.

As shown in FIG. 1, the communication terminal has a wireless transmission and reception processor 10, a transmission power controller 11, a field strength information acquiring unit 12, a data transmitting/receiving unit 13, a control information transmitting/receiving unit 14, a routing table creation/update processor 15, a storage unit 16, a display unit 17, an input unit, and a controller 19.

The wireless transmission and reception processor 10 performs processing for connecting the own terminal to the ad hoc network formed of multiple communication terminals, and transferring communication data and control information between other communication terminals and the own communication terminal by radio.

The transmission power controller 11 performs processing for controlling the field strength at the time of transmitting the data, based on the field strength of radio wave received from other communication terminals.

Specifically, the transmission power controller 11 performs processing such that when transmitting data to a certain communication terminal, if a field strength for the control information transmitted by the communication terminal is low, the transmission power controller 11 transmits the data at a specified transmission power value, or if the field strength is high, suppresses the data transmission power. The control information is transmitted from the respective communication terminals with a certain transmission power.

When a communication terminal (hereinafter, "the own communication terminal") receives a radio wave including control information from another communication terminal, the field strength information acquiring unit 12 of the communication terminal acquires information of the field strength of the radio wave received. The field strength information acquiring unit 12 also acquires information of the field strength of a radio wave which the another communication terminal receives with control information from a communication terminal other than the another communication terminal. The information of the field strength of the radio wave received by the another communication terminal is included in the control information received by the own communication terminal. The data structure of the control information will be explained later in detail.

The data transmitting/receiving unit 13 is a transmitting/receiving unit that transfers data to other communication terminals via the wireless transmission and reception processor 10. The control information transmitting/receiving unit 14 is a transmitting/receiving unit that transfers the control information for establishing a data communication route via the wireless transmission and reception processor 10.

The routing table creation/update processor 15 creates a routing table 16a stored in the storage unit 16, and updates the routing table 16a based on the received control information and the information of the field strength of the control information.

The routing table creation/update processor 15 selects an optimum communication route at the time of communicating the data, based on the information related to the field strength of the radio wave acquired by the field strength information acquiring unit 12, and information of number of transfers included in the control information, and stores the information of the selected communication route in the storage unit 16.

The storage unit 16 is a storage device such as a semiconductor memory and a hard disk drive, and stores the routing table 16a in which the routing information related to the transmission route for transmitting the data is registered. The routing table 16a will be explained later in detail.

The display unit 17 is a display device such as a liquid crystal display, and the input unit 18 is an input device such as a keyboard, a pen-type input unit, and a microphone for voice input. The controller 19 is a controller that controls the whole communication terminal.

Figure 2:
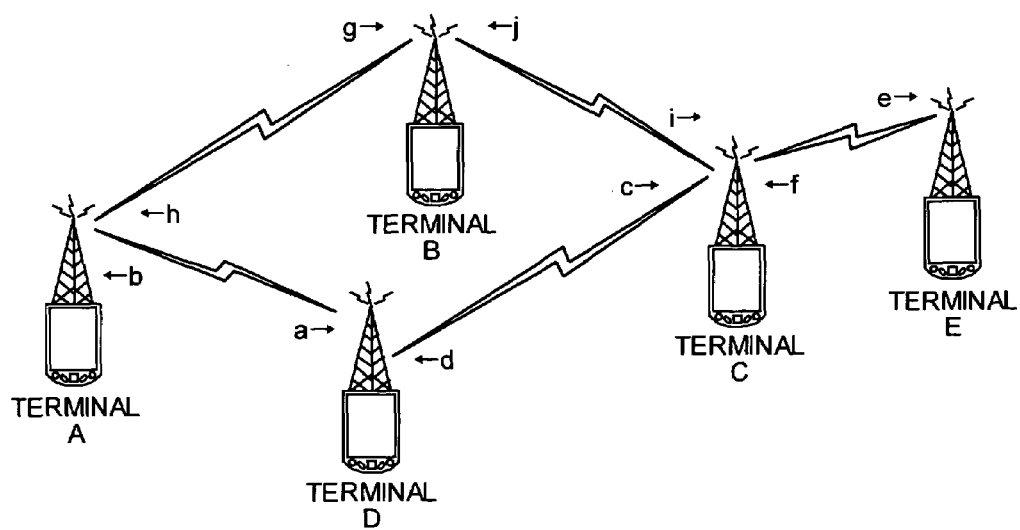
FIG. 2 is one example of wireless communication by respective communication terminals.

FIG. 2 is one example of wireless communication by respective communication terminals. As shown in FIG. 2, the communication terminals (terminals A to E) having a wireless communication function constitute an ad hoc network. In FIG. 2, the terminal A and the terminal B are within the access range of the radio wave, and hence direct transfer of data by the radio wave is possible. The terminal A and the terminal D, the terminal B and the terminal C, the terminal D and the terminal C, and the terminal C and the terminal E are respectively within the range in which direct transfer of data is possible.

The terminal A and the terminal C here are outside of the access range of radio wave, and cannot perform data transfer directly. However, since the terminal B or the terminal C relays the data, the terminal A and the terminal C can transfer data. When the terminal A and the terminal C transfer data, the routing table 16a is referred in order to determine the data transmission route.

In FIG. 2, the field strength of the radio waves received when the terminals A to E receive the control information from other terminals is shown. That is, the field strength of the radio wave received when the terminal A receives the control information from the terminal B is h, and the field strength of the radio wave received when the terminal A receives the control information from the terminal D is b.

Likewise, the field strength of the radio wave received when the terminal B receives the control information from the terminal A is g, the field strength of the radio wave received when the terminal B receives the control information from the terminal C is j, the field strength of the radio wave received when the terminal D receives the control information from the terminal A is a, the field strength of the radio wave received when the terminal D receives the control information from the terminal C is d, the field strength of the radio wave received when the terminal C receives the control information from the terminal B is i, the field strength of the radio wave received when the terminal C receives the control information from the terminal D is c, the field strength of the radio wave received when the terminal C receives the control information from the terminal E is f, and the field strength of the radio wave received when the terminal E receives the control information from the terminal C is e.

FIG. 3 is a routing table for respective communication terminals. As shown in FIG. 3, in the routing tables 30 to 34, information of destination terminal, number of transfers, first transfer destination terminal, a field strength of the first transfer destination terminal, a field strength of the own terminal, and the data transmission power is stored.

The destination terminal is identification information for identifying the communication terminal to be the data transmission destination. The number of transfers is information related to the number of data transfers performed by the respective communication terminals in the process in which data is transmitted to the destination terminal. However, the number of transfers increases than the actual number of data transfers with the lapse of time. That is, the number of transfers is also the information indicating the freshness of the information.

The first transfer destination terminal is identification information for identifying the communication terminal that first receives the data, when the communication terminal transmits data to the destination terminal. The field strength of the first transfer destination terminal is the information of the field strength of radio wave, at the time of receiving the control information from the first transfer destination terminal.

The field strength of the own terminal is the information of the field strength of radio wave received, when the first transfer destination terminal receives the control information from the own communication terminal. The data transmission power is the information of transmission power of radio wave used at the time of transmitting data to the first transfer destination terminal. The holding mode of the data route information is not limited to that shown in FIG. 3, and the data route information may be held in various other modes.

As shown in FIG. 3, in the routing table 30 for the terminal A, when the destination terminal is the terminal A, since the terminal A is the own communication terminal, the number of transfers is 0, and the column of first transfer destination terminal becomes blank. When the destination terminal is the terminal B, the number of transfers is 1, and the first transfer destination terminal is the terminal B, which is the destination.

When the destination terminal is the terminal C, the number of transfers is 2, and the first transfer destination terminal is the terminal D. When data is to be transmitted to the terminal C, there is a route via the terminal B and a route via the terminal D. An instance is shown here, in which the route via the terminal D is selected by routing processing explained later.

When the destination terminal is the terminal D, the number of transfers is 1, and the first transfer destination terminal is the terminal D. When the destination terminal is the terminal E, the number of transfers is 3, and the first transfer destination terminal is the terminal D. The same procedure applies to the routing tables 31 to 34 for other communication terminals.

For example, when data is transmitted from the terminal A to the terminal E, the destination terminal is the terminal E, and the terminal A, which transmits the data, searches a line in which the destination terminal is the terminal E from the routing table 30 for the own terminal. In the line where the destination terminal is the terminal E, since the terminal D is registered as the first transfer destination terminal, the terminal A transmits the data to the terminal D.

The terminal D having received the data searches a line in which the destination terminal is the terminal E from the routing table 33 for the own terminal, in the same manner as the terminal A. In the line where the destination terminal is the terminal E, since the terminal C is registered as the first transfer destination terminal, and hence, the terminal B transmits data to the terminal C.

The terminal C having received the data searches a line in which the destination terminal is the terminal E from the routing table 32 for the own terminal. In the line where the destination terminal is the terminal E, since the terminal E is registered as the first transfer destination terminal, and the terminal E is the destination terminal, the terminal C transmits the data to the terminal E, thereby finishing the transmission of data from the terminal A to the terminal E. Thereafter, the terminal E returns a reception completion message to the sender terminal.

In this manner, the respective communication terminals can transmit the data to a desired communication terminal. In the routing tables 30 to 34, the information of all communication terminals having passed through is not registered, but only the information of the first transfer destination terminal with respect to the respective destination terminals and the number of transfers is registered. Therefore, there is an advantage in that the capacity of the storage device is not too much decreased.

The routing tables 30 to 34 shown here are not fixed, and are updated regularly. For example, when the power source of the terminal C is cut off, or the terminal C departs from a communicable range, which the radio wave can reach, data transmission via the terminal C is not possible.

Therefore, the respective communication terminals transmit the control information for updating the routing tables 30 to 34 for every predetermined time, to keep the state of the routing tables 30 to 34 fresh, thereby enabling correspondence to changes in the state of respective communication terminals.

FIG. 4 is one example of the data structure of the control information. As shown in FIG. 4, the control information 40 includes information of the sender terminal and the destination terminal. The sender terminal information is information for identifying the communication terminal, which transmits the control information 40 to this terminal. The sender terminal can be the first transfer destination terminal of the communication terminal that transmits data.

In the column of destination terminal, information of the communication terminals that can be the destination terminal at the time of data transmission is registered. The information of the destination terminal includes information of name of terminal, number of transfers, and a field strength, and is the information created based on the information stored in the routing table 16a.

The terminal name is a terminal name for identifying the communication terminal that can be the destination terminal at the time of data transmission, and corresponds to the destination terminal stored in the routing table 16a. Number of transfers indicates of a number obtained by adding 1 to the number of transfers stored in the routing table 16a. The field strength is information of the field strength of radio wave received, as the control information is received from the communication terminal indicated by the terminal name.

For example, when it is assumed that the terminal A receives the control information 40, the terminal A can recognize that when the destination terminal is the terminal E, the number of transfers is 3, and the first transfer destination terminal is the terminal B.

The terminal A searches the destination terminal in the routing table 16a for the own communication terminal from the terminal name of the destination terminal in the control information, and obtains the corresponding number of transfers. The terminal A then compares the number of transfers in the routing table 16a with the number of transfers included in the control information, and when the number of transfers included in the control information is smaller, changes the first transfer destination terminal in the routing table 16a to the sender terminal in the control information, and acquires the corresponding number of transfers and the field strength of the own terminal from the control information to change these.

As a result, an efficient data communication route with a fewer number of transfers when the terminal A transmits data to the destination terminal is stored in the routing table 16a.

FIG. 5 is one example of data structure of transmission data to be transmitted according to the data communication route established in this manner. As shown in FIG. 5, ID, destination terminal, sender terminal, number of hops, and data are included in the transmission data 50.

The ID is identification information for identifying the data, and is used for detecting the situation when the same data is transmitted to the same communication terminal a plurality of times, to discard the data. The number of 1028 here is set as the ID. However, not only numbers but also information that can identify the data may be used as the ID.

The destination terminal is identification information for identifying the destination terminal for transmitting data. The sender terminal is identification information for identifying the sender terminal of the data. The number of hops is added by 1, every time the data is transferred by the respective communication terminals. When the number of hops exceeds a preset largest number of hops, the data is discarded.

In the example shown in FIG. 5, a data structure of transmission data 50, when the terminal A, being the sender terminal, transmits data to the terminal E, being the destination terminal, and the terminal E receives the data, is shown. The number of hops increases to 3, while the data is transmitted from the terminal A to the terminal E.

A processing procedure for the communication terminal to transmit the control information will be explained next. FIG. 6 is a flowchart for explaining the processing procedure for the communication terminal to transmit the control information. As shown in FIG. 6, at first, the routing table creation/update processor 15 in the communication terminal reads the information stored in the routing table 16a, that is, the information of the destination terminal, the number of transfers, the first transfer destination terminal, and the field strength of the first transfer destination terminal (step S601), and adds 1 to the read respective number of transfers (step S602).

The routing table creation/update processor 15 then checks if there is a destination terminal having the number of transfers greater than a predetermined maximum number of transfers (step S603).

When there is no destination terminal having the number of transfers greater than the maximum number of transfers (step S603, No), the routing table creation/update processor 15 reflects in the routing table 16a the read destination terminal name, the number of transfers added by 1, and the information in which the own terminal name is set in the sender terminal name (step S604), and the control information transmitting/receiving unit 14 transmits the control information including the information of the sender terminal, the terminal name, the number of transfers, as shown in FIG. 4, and the field strength to communication terminals in the surroundings (step S605).

When there is a destination terminal having the number of transfers greater than the maximum number of transfers (step S603, Yes), the routing table creation/update processor 15 deletes from the routing table 16a the information of the corresponding destination terminal, that is, the information of the destination terminal, the number of transfers, the first transfer destination terminal, the field strength of the first transfer destination terminal, the field strength of the own terminal, and the data transmission power, and also deletes the information from the control information to be transmitted (step S608). As a result, when the communication terminal departs from the radio communicable range, or when the power source is cut off, the information of the corresponding communication terminal can be deleted.

After deletion of information, the routing table creation/update processor 15 proceeds to step S604, to reflect in the routing table 16a the read destination terminal name, the number of transfers added by 1, and the information in which the own terminal name is set in the sender terminal name, and transmit the control information including the information of the sender terminal, the terminal name, the number of transfers, and the field strength to communication terminals in the surroundings.

After transmission of the control information, the routing table creation/update processor 15 sets the number of transfers of the own terminal to "0" (step S606), and stands by for predetermined time until next transmission processing for the control information is started (step S607).

The processing procedure for the communication terminal to create and update the routing table will be explained next. FIG. 7 is a flowchart for explaining a processing procedure for the communication terminal to create and update the routing table.

As shown in FIG. 7, the control information transmitting/receiving unit 14 in the communication terminal waits for receiving the control information transmitted from another communication terminal (step S701). The control information transmitting/receiving unit 14 then checks if the control information has been received (step S702), and when the control information has not been received (step S702, No), the control information transmitting/receiving unit 14 returns to step S701, and waits for receiving the control information.

When the control information has been received (step S702, Yes), the field strength information acquiring unit 12 checks if the field strength at the time of receiving the control information is equal to or greater than a threshold (step S703), and when the field strength is not greater than the threshold (step S703, No), discards the received control information (step S716), and proceeds to step S701 to continue the processing.

When the field strength is greater than the threshold (step S703, Yes), the routing table creation/update processor 15 acquires the terminal name of the destination terminal from the received control information (step S704).

The routing table creation/update processor 15 checks if the terminal name has been already registered as the destination terminal in the routing table 16a (step S705). When the terminal name has not been registered (step S705, No), the field strength information acquiring unit 12 executes the processing for improving the accuracy of field strength (step S713), and the transmission power controller 11 calculates the data transmission power at the time of transmitting the data to the communication terminal that has transmitted the control information by using a predetermined relational expression, based on the field strength information acquired by the accuracy improving processing (step S714). The processing procedure for improving the accuracy of the field strength will be explained in detail in FIG. 8.

The data transmission power here is calculated by using the predetermined relational expression, based on the field strength information acquired by the processing for improving the accuracy of field strength, but a correspondence table between the field strength of the received control information and the data transmission power may be created, and the data transmission power may be determined by referring to the created correspondence table.

Subsequently, the routing table creation/update processor 15 registers new route information in the routing table 16a (step S715), and control proceeds to step S701, to continue the subsequent processing.

Specifically, the routing table creation/update processor 15 stores the information of the sender terminal, the terminal name, the number of transfers, and the field strength included in the control information, as the first transfer destination terminal, the destination terminal, the number of transfers, and the field strength of the own terminal in the routing table 16a.

The routing table creation/update processor 15 associates the field strength information in the received control information and the data transmission power with the first transfer destination terminal that has transmitted the control information, and stores these as the field strength of the first transfer destination terminal and the data transmission power in the routing table 16a.

At step S705, when the terminal name included in the control information has been already registered as the destination terminal in the routing table 16a (step S705, Yes), the routing table creation/update processor 15 acquires the information of the number of transfers of the destination terminal corresponding to the terminal name from the routing table 16a (step S706).

Subsequently, the routing table creation/update processor 15 checks if the number of transfers included in the control information is greater than the number of transfers acquired from the routing table 16a (step S706), and when it is greater than that (step S706, Yes), the routing table creation/update processor 15 proceeds to step S716, to discard the control information, and continue the subsequent processing.

When the number of transfers included in the control information is not greater than the number of transfers acquired from the routing table 16a (step S706, No), the field strength information acquiring unit 12 executes the processing for improving the accuracy of field strength (step S707). The processing for improving the accuracy field strength will be explained in detail in FIG. 8.

The routing table creation/update processor 15 then checks if the number of transfers included in the control information is the same as that acquired from the routing table 16a (step 5708).

When the number of transfers is not the same (step S708, No), the transmission power controller 11 calculates the data transmission power at the time of transmitting the data to the communication terminal that has transmitted the control information by using the predetermined relational expression, based on the field strength information acquired by the accuracy improving processing (step S711).

The routing table creation/update processor 15 updates the information stored in the routing table 16a (step S712), and proceeds to step S701, to continue the subsequent processing.

Specifically, the routing table creation/update processor 15 compares the number of transfers of the respective destination terminals stored in the routing table 16a with the number of transfers of the respective terminals included in the control information, to perform processing for updating the number of transfers in the routing table 16a of the destination terminal having a greater number of transfers than that in the control information, by the number of transfers in the control information.

The routing table creation/update processor 15 also performs processing for updating the information of the first transfer destination terminal for the destination terminal stored in the routing table 16a and the field strength of the own terminal, by the information of the sender terminal included in the control information and the field strength corresponding to the own terminal.

The routing table creation/update processor 15 also stores the information of the field strength for the control information acquired by the field strength information acquiring unit 12, in the column of field strength of the first transfer destination terminal in the routing table 16a, as the information of field strength of the first transfer destination terminal that has transmitted the control information.

The routing table creation/update processor 15 also stores the information of data transmission power in the routing table 16a, associating it with the first transfer destination terminal, by using a value calculated by the transmission power controller 11.

At step S708, when the number of transfers included in the control information is the same as the number of transfers acquired from the routing table 16a (step S708, Yes), the routing table creation/update processor 15 performs processing for selecting a route based on the field strength information (step S709). The routing processing will be explained in detail in FIG. 9.

Thereafter, the routing table creation/update processor 15 checks if it is determined to discard the received control information in the routing processing (step S710), and when it is determined to discard the control information (step S710, Yes), the routing table creation/update processor 15 proceeds to step S716, to discard the control information, and continue the subsequent processing. When it is not determined to discard the control information (step S710, No), the routing table creation/update processor 15 proceeds to step S711, to continue the subsequent processing.

Figure 8:
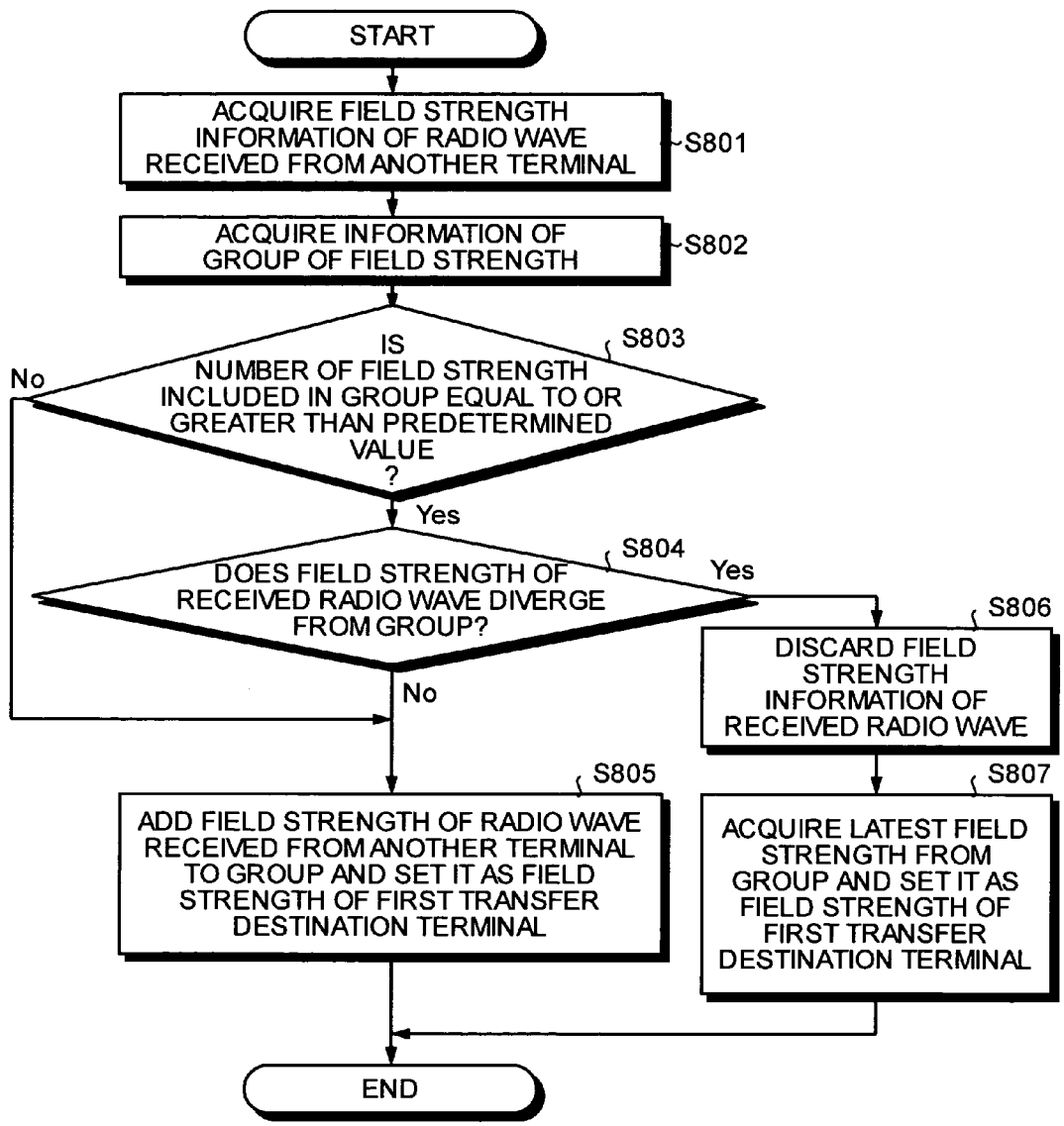
FIG. 8 is a flowchart for explaining a processing procedure for improving the accuracy of a field strength shown in FIG. 7.

The detailed processing procedure for improving the accuracy of the field strength shown in FIG. 7 will be explained. FIG. 8 is a flowchart indicating the processing procedure for improving the accuracy of the field strength shown in FIG. 7.

As shown in FIG. 8, the field strength information acquiring unit 12 first acquires the field strength information of radio wave received from another communication terminal (step S801). The field strength information acquiring unit 12 then acquires the group information in which the acquired field strength information is collected (step S802), and checks if the number of field strength included in the group is equal to or greater than a predetermined value (step S803). The field strength group is obtained by collecting the field strength for the control information received by the own communication terminal from other communication terminals for each communication terminal.

When the number of field strength included in the group is not equal to or greater than the predetermined value (step S803, No), the field strength information acquiring unit 12 adds the field strength of the radio wave received from other terminals to the group, and designates the obtained field strength as the field strength of the first transfer destination terminal (step S805).

When the number of field strength included in the group is equal to or greater than the predetermined value (step S803, Yes), the field strength information acquiring unit 12 checks if the field strength of the received radio wave diverges from the group (step S804).

Specifically, the field strength information acquiring unit 12 calculates a moved distance of the communication terminal, from the value of field strength included in the group and the value of field strength of the received radio wave, according to predetermined calculation, and when the moved distance is equal to or greater than a predetermined threshold, determines that the field strength of the received radio wave diverges from the group. The threshold here is set to a distance for which the communication terminal can generally move.

When the field strength of the received radio wave diverges from the group (step S804, Yes), the field strength information acquiring unit 12 discards the field strength information of the received radio wave (step S806), acquires the latest field strength information from the group to set the acquired field strength as the field strength of the first transfer destination terminal (step S807), and continues the subsequent processing.

When the field strength of the received radio wave does not diverge from the group (step S804, No), the field strength information acquiring unit 12 adds the field strength information of the radio wave received from other communication terminals to the group for each communication terminal, to set the field strength of the received radio wave as the field strength of the first transfer destination terminal (step S805), and continues the subsequent processing.

Figure 9:
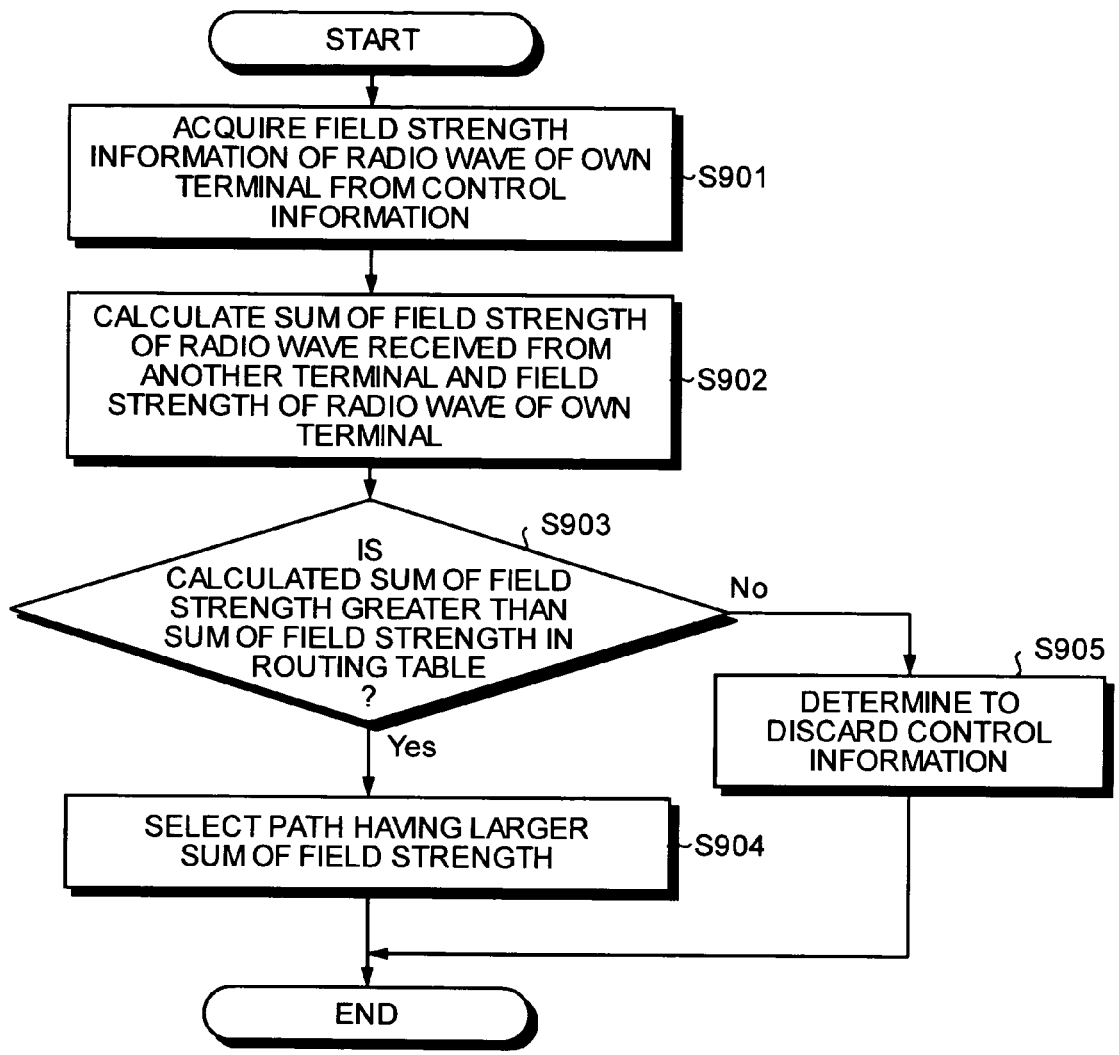
FIG. 9 is a flowchart for explaining a specific procedure for routing processing shown in FIG. 7.

The detailed procedure in the routing processing shown in FIG. 7 will be explained below. FIG. 9 is a flowchart for explaining the procedure in the routing processing shown in FIG. 7.

As shown in FIG. 9, the field strength information acquiring unit 12 acquires the field strength information of the radio wave of the own communication terminal from the control information (step S901). That is, the field strength information acquiring unit 12 searches the terminal name corresponding to the own communication terminal from the destination terminals in the control information, to acquire the field strength information stored therein associated with the terminal name.

The routing table creation/update processor 15 then calculates the sum of the field strength of the radio wave at the time of receiving the control information from other communication terminals, and the field strength of the radio wave of the own communication terminal acquired from the control information (step S902), and checks if the calculated sum of the field strength is equal to or greater than the sum of the field strength of the first transfer destination terminal stored in the routing table 16a and the field strength of the own communication terminal stored in the same routing table 16a (step S903).

When the calculated sum of the field strength is greater than the sum of the field strength in the routing table 16a (step S903, Yes), the routing table creation/update processor 15 selects the route having a greater sum of the field strength as a new route (step S904), to finish the route selection processing.

When the calculated sum of the field strength is not greater than the sum of the field strength in the routing table 16a (step S903, No), the routing table creation/update processor 15 determines to discard the control information (step S905), to finish the routing processing.

Figure 10:
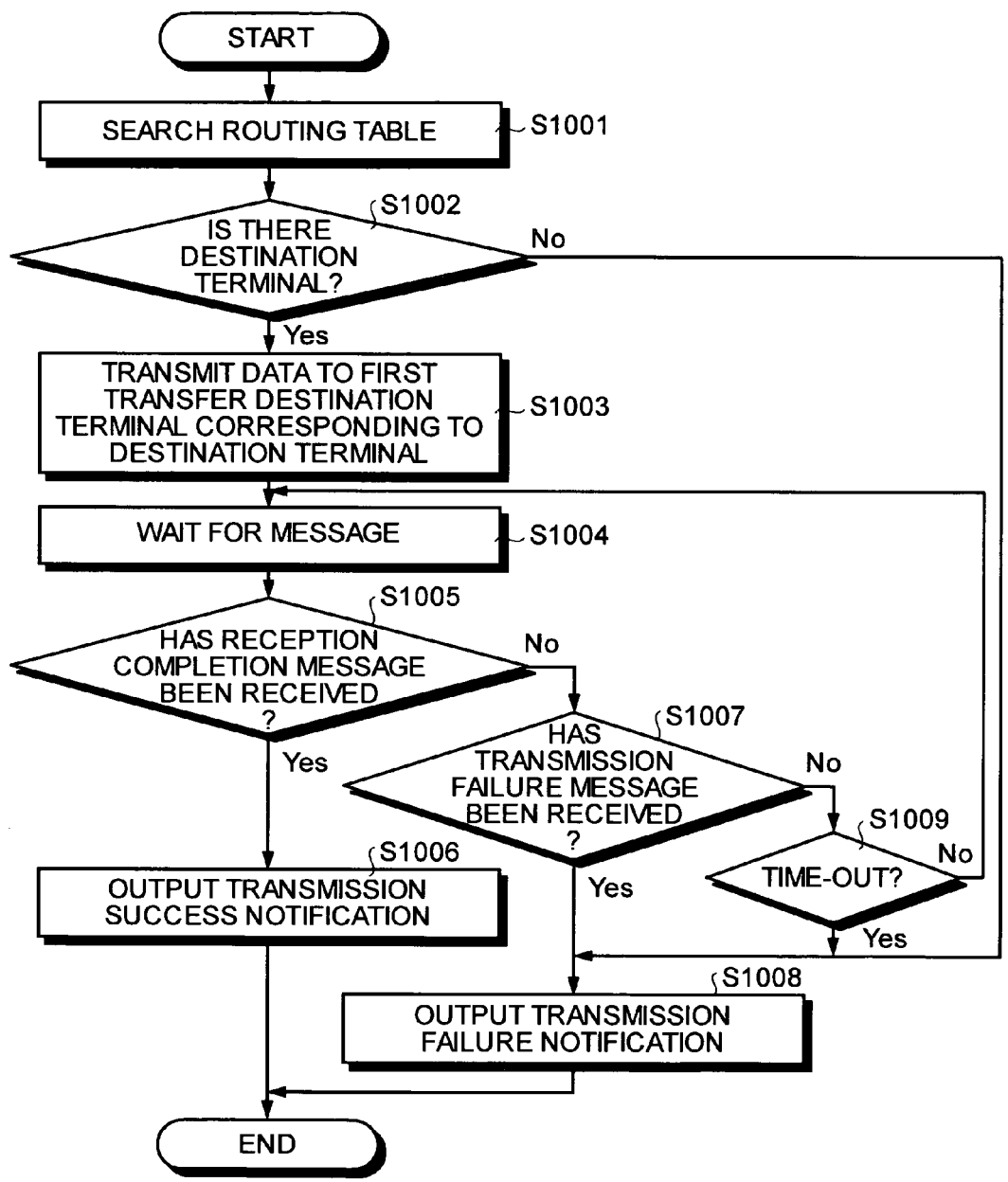
FIG. 10 is a flowchart for explaining a processing procedure for the communication terminal to transmit data.

A processing procedure for the communication terminal to transmit data will be explained next. FIG. 10 is a flowchart for explaining the processing procedure for the communication terminal to transmit data. As shown in FIG. 10, after the destination terminal for transmitting the data is specified, the data transmitting/receiving unit 13 in the communication terminal searches the routing table 16a (step S1001), to check if the corresponding destination terminal is registered in the routing table 16a (step S1002).

When the destination terminal is not registered (step S1002, No), the data transmitting/receiving unit 13 outputs a data transmission failure notification to the application software or the like that has transmitted the data, to finish the transmission processing of data.

When the destination terminal has been already registered (step S1002, Yes), the data transmitting/receiving unit 13 transmits data to the first transfer destination terminal corresponding to the destination terminal, to which the data is to be transmitted (step S1003). Thereafter, the data transmitting/receiving unit 13 waits for a message from the communication terminal, to which the data is to be transferred or the destination terminal (step S1004), to check whether a reception completion message has been received (step S1005).

When the reception completion message has been received (step S1005, Yes), the data transmitting/receiving unit 13 transmits a transmission success notification to the application software or the like that has transmitted the data (step S1006).

When the reception completion message has not been received (step S1005, No), the data transmitting/receiving unit 13 checks whether a transmission failure message has been received (step S1007). When the transmission failure message has been received (step S1007, Yes), the data transmitting/receiving unit 13 proceeds to step S1008, to output a data transmission failure notification to the application or the like that has transmitted the data, to finish the data transmission processing.

When the transmission failure message has not been received (step S1007, No), the data transmitting/receiving unit 13 checks whether the message waiting has become time-out (step S1009).

When it becomes time-out (step S1009, Yes), the data transmitting/receiving unit 13 proceeds to step S1008, to output a data transmission failure notification to the application or the like that has transmitted the data, to finish the data transmission processing.

When it has not become time-out (step S1009, No), the data transmitting/receiving unit 13 proceeds to step S1004, to wait for the message.

Figure 11:
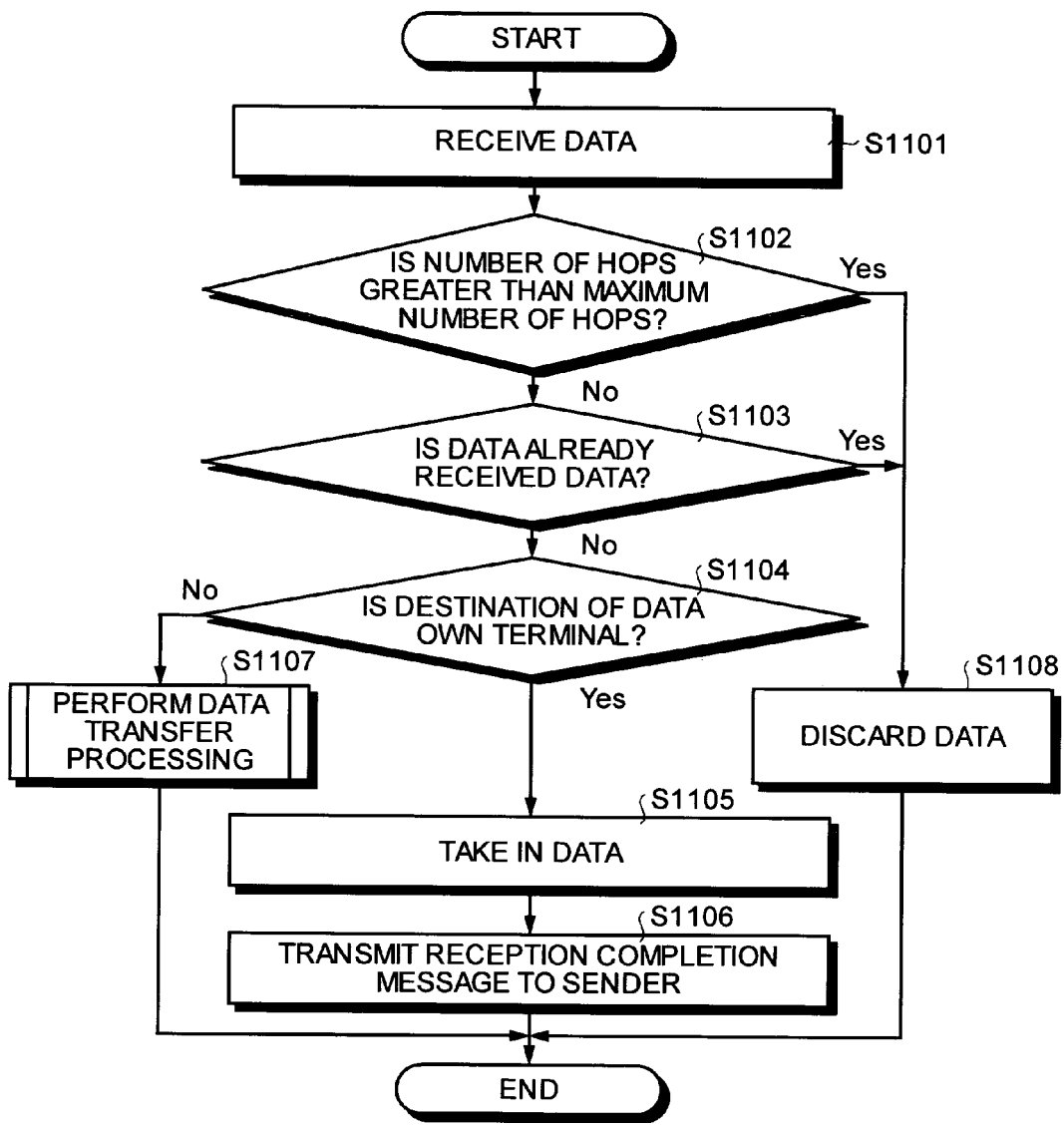
FIG. 11 is a flowchart for explaining a processing procedure for the communication terminal to receive data.

A processing procedure for the communication terminal to receive data will be explained below. FIG. 11 is a flowchart for explaining the processing procedure for the communication terminal to receive data. As shown in FIG. 11, the data transmitting/receiving unit 13 receives the transmitted data (step S1101), and checks if the number of hops included in the transmitted data is greater than the maximum number of hops (step S1102).

When the number of hops is greater than the maximum number of hops (step S1102, Yes), the data transmitting/receiving unit 13 discards the received data (step S1108), and finishes the reception processing as it is.

When the number of hops is not greater than the maximum number of hops (step S1102, No), the data transmitting/receiving unit 13 checks if the data is the already received data based on the data ID (step S1103).

When the data has already been received (step S1103, Yes), the data transmitting/receiving unit 13 discards the data (step S1108), to finish the reception processing as it is. When the data has not been received yet (step S1103, No), the data transmitting/receiving unit 13 checks if the destination of the data is the own communication terminal (step S1104).

When the destination of the data is the own communication terminal (step S1104, Yes), the data transmitting/receiving unit 13 takes in the transmitted data (step S1105), and transmits a reception completion message to the sender communication terminal (step S1106), to finish the reception processing.

When the destination of the data is not the own communication terminal (step S1104, No), the data transmitting/receiving unit 13 performs data transfer processing (step S1107), to finish the data reception processing. The data transfer processing will be explained in detail with reference to FIG. 12.

Figure 12:
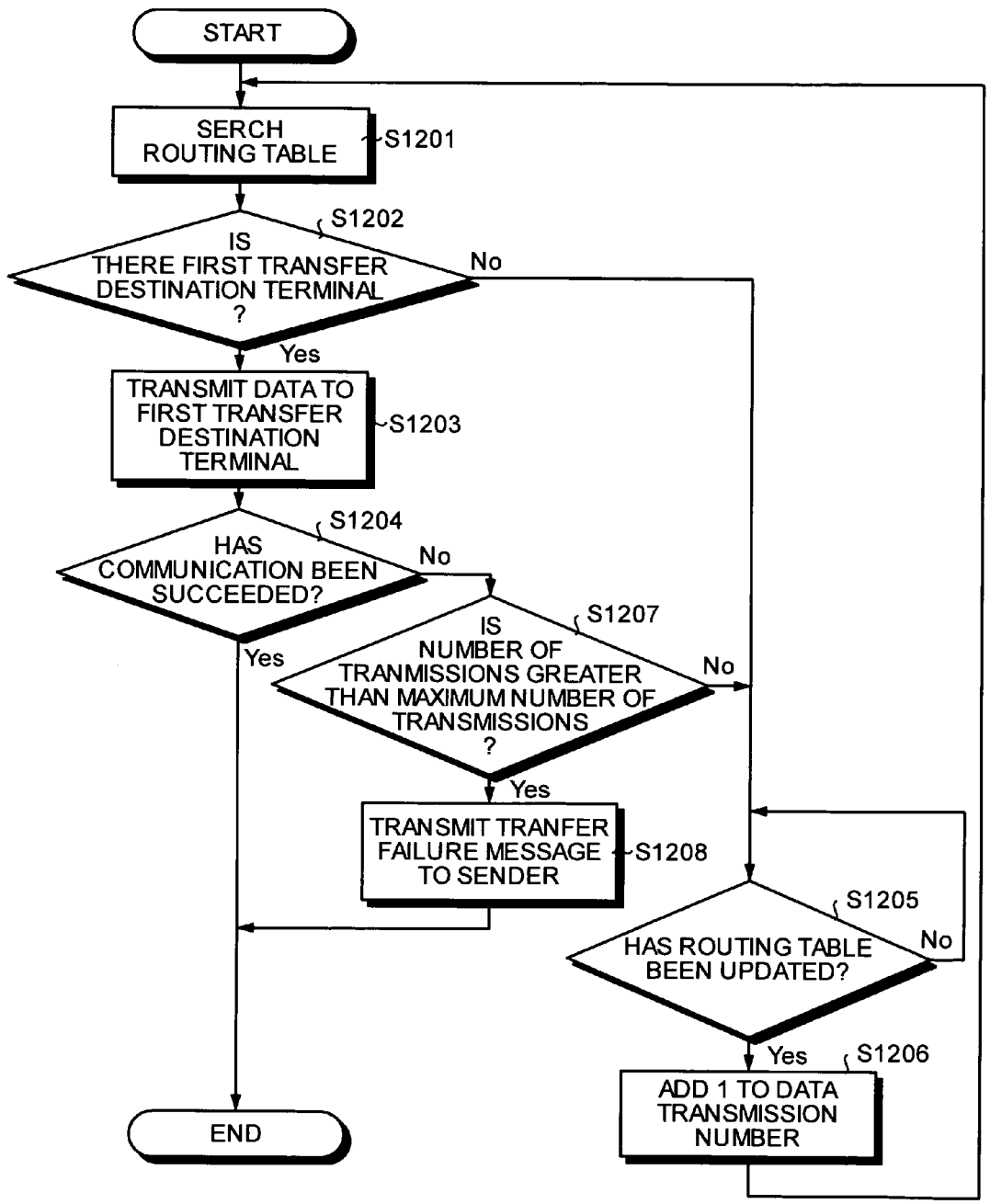
FIG. 12 is a flowchart for explaining a specific procedure for data transmission processing shown in FIG. 11.

The detailed processing procedure for the data transfer processing shown in FIG. 11 will be explained next. FIG. 12 is a flowchart for explaining a specific procedure for data transfer processing shown in FIG. 11. As shown in FIG. 12, after having received the data, the data transmitting/receiving unit 13 searches the routing table 16a (step S1201), to check if the first transfer destination terminal corresponding to the destination terminal of data is registered in the routing table 16a (step S1202).

When the first transfer destination terminal corresponding to the destination terminal of data is not registered (step S1202, No), the data transmitting/receiving unit 13 stands by until the routing table 16a is updated (step S1205), and checks again whether the first transfer destination terminal corresponding to the destination terminal of data is registered in the routing table 16a.

When the routing table 16a is updated (step S1205, Yes), the data transmitting/receiving unit 13 adds 1 to the data transmission number (step S1206), and control proceeds to step S1201, at which the transmission power controller 11 searches the routing table 16a again.

At step S1202, when the first transfer destination terminal corresponding to the destination terminal of data is registered in the routing table 16a (step S1202, Yes), the data transmitting/receiving unit 13 transmits the data to the first transfer destination terminal (step S1203), to check if communication has been succeeded (step S1204).

When the communication has been succeeded (step S1204, Yes), the data transmission processing finishes. When the communication has not been succeeded (step S1204, No), the data transmitting/receiving unit 13 checks if the number of transmissions becomes greater than a preset maximum number of transmissions (step S1207).

When the number of transmissions is not greater than the maximum number of transmissions (step S1207, No), the data transmitting/receiving unit 13 proceeds to step S1205, to stand by until the routing table 16a is updated, and continue the subsequent processing.

When the number of transmissions is greater than the maximum number of transmissions (step S1207, Yes), the data transmitting/receiving unit 13 transmits a transfer failure message to the sender (step S1208), to finish the data transfer processing.

Figure 13:
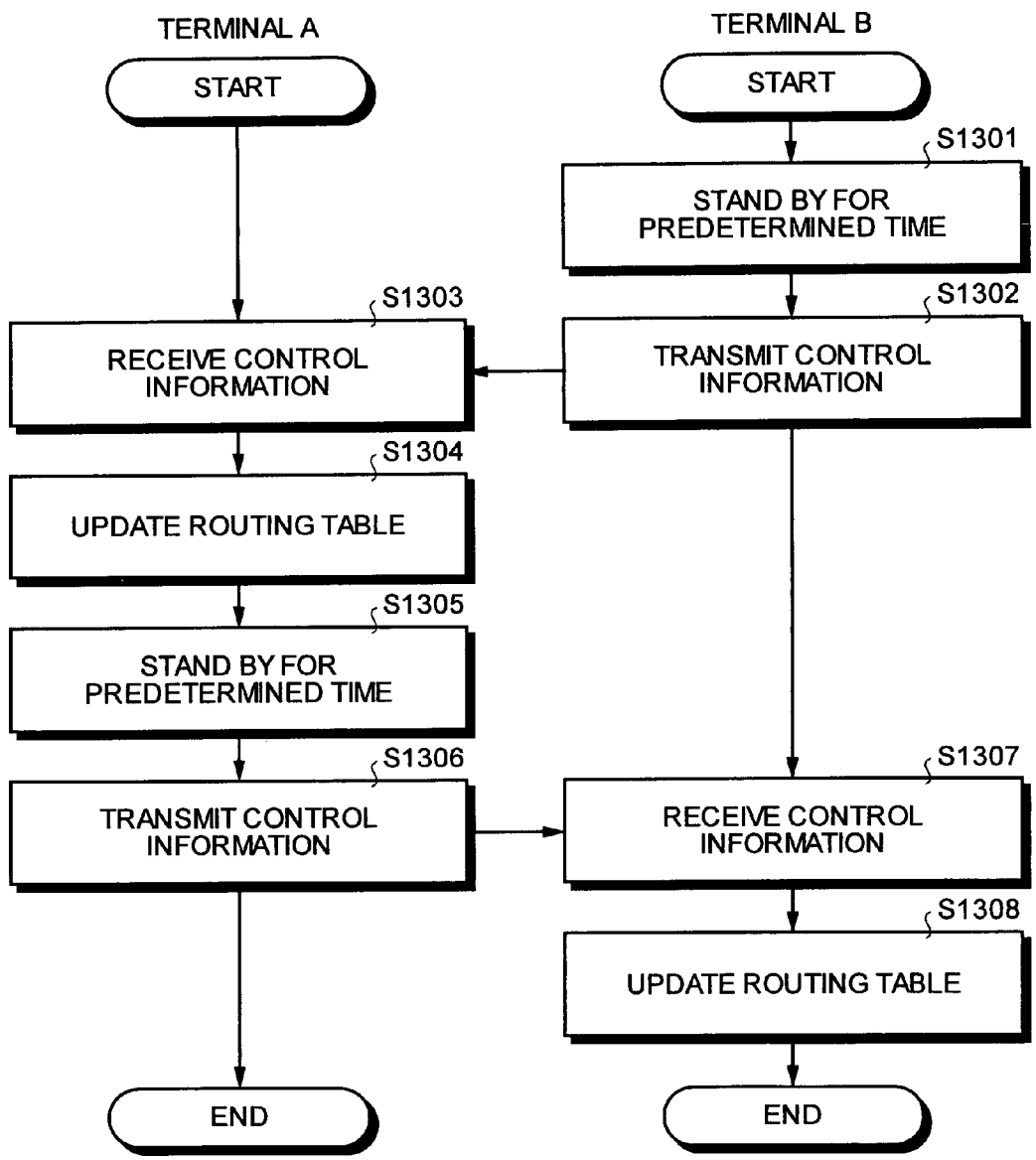
FIG. 13 is a flowchart for explaining a processing procedure for the communication terminal to newly establish a data transmission route.

A processing procedure for the communication terminal to newly establish a data transmission route will be explained next. FIG. 13 is a flowchart for explaining the processing procedure for the communication terminal to newly establish a data transmission route. In FIG. 13, an instance in which control information is transferred between the terminal A and the terminal B to establish a data transmission route is shown.

As shown in FIG. 13, the control information transmitting/receiving unit 14 in the terminal B stands by for predetermined time in order to transmits the control information regularly (step S1301), and transmits the control information to the communication terminals in the surroundings (step S1302).

Since the terminal A is within the range communicable with the terminal B, the control information transmitting/receiving unit 14 in the terminal A receives the control information transmitted from the terminal B (step S1303). Subsequently, the routing table creation/update processor 15 in the terminal A updates the routing table 16a for the own communication terminal based on the received control information (step S1304). The update processing is similar to the one shown in FIG. 7.

Since the terminal A also transmits the control information regularly, the control information transmitting/receiving unit 14 in the terminal A stands by for predetermined time (step S1305), and transmits the control information to the communication terminals in the surroundings based on the updated routing table 16a (step S1306).

The control information transmitting/receiving unit 14 in the terminal B receives the control information (step S1307), and updates the routing table 16a for the own communication terminal (step S1308), to finish the processing for establishing the data transmission route.

In the first embodiment, the field strength information acquiring unit 12 acquires the information related to the field strength of the radio wave, and the routing table creation/update processor 15 selects a data communication route based on the information related to the acquired field strength, and stores the information related to the selected data communication route in the routing table 16a. As a result, even when multiple data transmission routes are present, an optimum data transmission route can be selected.

In the first embodiment, the field strength information acquiring unit 12 determines whether the acquired field strength of the radio wave is smaller than a predetermined threshold, and when the field strength information acquiring unit 12 determines that the field strength is smaller than the predetermined threshold, the routing table creation/update processor 15 excludes the information of the field strength to select the data transmission route. As a result, a stable wireless communication route can be selected by excluding a communication terminal having a low field strength.

In the first embodiment, when the data is transmitted based on the information related to the data communication route stored in the routing table 16a, the transmission power controller 11 controls the data transmission power based on the information related to the field strength of the radio wave acquired by the field strength information acquiring unit 12. As a result, when the field strength of radio wave of another communication terminal is large, by weakening the data transmission power with respect to the communication terminal, communication congestion is reduced, and power saving for the communication terminal can be achieved.

In the first embodiment, the routing table creation/update processor 15 selects a communication route having a small number of transfers, when data is transferred by a communication terminal that relays the data to a communication terminal, being the destination terminal of the data. When multiple communication routes have the same number of transfers, the routing table creation/update processor 15 selects the data communication route based on the information related to the field strength of the radio wave received by another communication terminal when the another communication terminal receives the radio wave transmitted by the own communication terminal, and the field strength of the radio wave received when the own communication terminal receives the radio wave transmitted by the other communication terminal. As a result, a stable wireless communication route can be selected.

In the first embodiment, when it is determined that the field strength of the radio wave departs from a predetermined range, the routing table creation/update processor 15 excludes the information related to the field strength determined to be outside the predetermined range, to select the data communication route. As a result, by excluding the information of an abnormal field strength, the wireless communication route can be selected highly accurately.

In the first embodiment, the predetermined range is a range determined based on the field strength of radio wave transmitted a plurality of times by the same communication terminal. As a result, the wireless communication route can be selected highly accurately, from the comparison with the field strength of radio wave transmitted a plurality of times by the same communication terminal.

A modification example of the first embodiment will be explained below. In the first embodiment, when the number of transfers is the same between multiple transmission routes for transmitting data to the destination terminal, a transmission route for transmitting data is selected based on the sum of the field strength of the radio waves received when the own communication terminal receives the control information from other communication terminals and the field strength of the radio wave received by the other communication terminals when other communication terminals receive the control information from the own communication terminal. However, an optimum data transmission route may be selected, taking into consideration the field strength for the control information of all communication terminals included in the route to the destination terminal, to which the data is transmitted.

In this case, the communication terminal that selects the data transmission route acquires the information of the current data transmission route from other communication terminals, and the information of the field strength of the radio waves when the respective communication terminals receive the control information from other communication terminals. The respective communication terminals here can acquire the information of the data transmission route and the information of the field strength by transferring information therebetween.

In FIG. 2, for example, a case is considered when the terminal A acquires information of transmission route for transmitting data to the terminal E, and the information of the field strength of the respective communication terminals included in the transmission route. In this case, the terminals E, C, and B add the information for identifying the own communication terminal, and the information of field strengths e, f, i, j, and g of the radio waves received when the own communication terminal receives the control information from other communication terminals, respectively, and transmit the information.

By receiving the information, the terminal A can acquire the information of the transmission route for transmitting data to the terminal E, and the information of the field strength of the respective communication terminals included in the transmission route. Similarly, the terminal A can acquire the information of the transmission route for transmitting data to the terminal E via the terminals D and C, and the information of field strengths e, f, c, d, and a of the respective communication terminals included in the transmission route.

When the number of transfers in the data transmission route specified by the received control information is the same as the number of transfers in the data communication route stored in the routing table, the terminal A calculates the number of communication terminals having the field strengths e, f, i, j, g, h or e, f, c, d, a, b greater than a predetermined reference value in the respective communication routes, and selects the communication route having a greater number, to update the routing table.

In the respective communication routes, the whole field strengths e, f, i, j, g, h or e, f, c, d, a, b of the radio waves received when the communication terminal receives the control information are used, but the field strengths e, i, g or e, c, a of the radio waves received when the respective communication terminals receive from one direction may be used, or the field strengths f, j, h or f, d, b of the radio waves received when the respective communication terminals receive from the other direction may be used.

Figure 14:
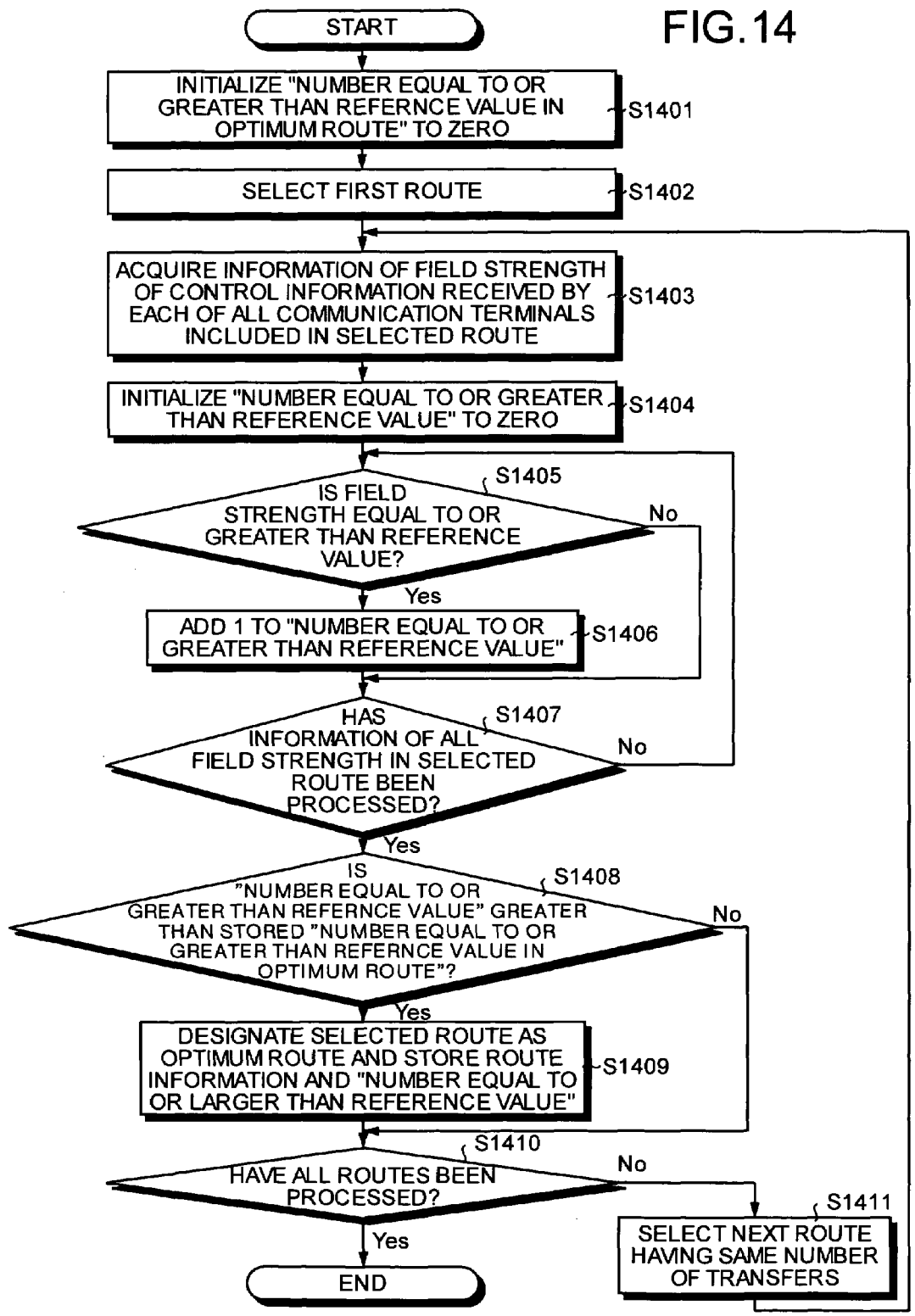
FIG. 14 is a flowchart for explaining a procedure for routing processing performed by the communication terminal based on information of a field strength of respective communication terminals on a data transmission route.

The procedure for the routing processing will now be explained. FIG. 14 is a flowchart for explaining the procedure for routing processing performed by the communication terminal based on the information of the field strength of respective communication terminals on the data transmission route. The processing shown in FIG. 14 is a modification example of the processing shown in FIG. 9.

As shown in FIG. 14, the routing table creation/update processor 15 first initializes the "number equal to or greater than the reference value in the optimum route" to zero (step S1401). The routing table creation/update processor 15 then selects the first route for performing the routing processing (step S1402).

The routing table creation/update processor 15 acquires the information of the field strength of the control information received by each of all communication terminals included in the selected route (step S1403), and initializes the "number equal to or greater than the reference value" to zero (step S1404).

The routing table creation/update processor 15 determines whether the field strength of a certain communication terminal is equal to or greater than the reference value (step S1405), and when the field strength is equal to or greater than the reference value (step S1405, Yes), adds 1 to the "number equal to or greater than the reference value" (step S1406), and then determines whether the information of the field strength of all communication terminals in the selected route has been processed (step S1407).

At step S1405, when the field strength of a certain terminal is not equal to or greater than the reference value (step S1405, No), the routing table creation/update processor 15 proceeds to step S1407, to continue the subsequent processing.

At step S1407, when the information of the field strength of all communication terminals has not been processed (step S1407, No), the routing table creation/update processor 15 proceeds to step S1405, to determine whether the field strength of the unprocessed communication terminal is equal to or greater than the reference value.

When the processing of the field strength information of all communication terminals has finished (step S1407, Yes), the routing table creation/update processor 15 determines whether the "number equal to or greater than the reference value" is greater than the stored "number equal to or greater than the reference value in the optimum route" (step S1408).

When the "number equal to or greater than the reference value" is greater than the stored "number equal to or greater than the reference value in the optimum route" (step S1408, Yes), the routing table creation/update processor 15 stores the route information by designating the route selected at step S1402 as the optimum route, and stores the "number equal to or greater than the reference value" as the "number equal to or greater than the reference value in the optimum route" (step S1409).

The routing table creation/update processor 15 then determines whether all routes have been processed (step S1410), and when all routes have not been processed (step S1410, No), selects the next route having the same number of transfers (step S1411), and proceeds to step S1403 to continue the subsequent processing.

When all routes have been processed (step S1410, Yes), the routing table creation/update processor 15 finishes the routing processing. At step S1408, when the "number equal to or greater than the reference value" is not greater than the stored "number equal to or greater than the reference value in the optimum route" (step S1408, No), the routing table creation/update processor 15 proceeds to step S1410, to determine whether all routes have been processed.

In the modification example, when the number of transfers in the data communication routes is the same, in the respective communication routes, the number of communication terminals having a field strength greater than the predetermined value is calculated, and the communication route having the greater number is selected. However, weighting may be performed with respect to the field strength of the respective communication terminals, and the weighted field strengths may be added for each communication route, so that the communication route having a greater additional value is selected.

Specifically, the routing table creation/update processor 15 compares the acquired field strength of the respective communication terminals with a predetermined reference value, converts all values of the field strength greater than the predetermined reference value to a certain value, and gives a smaller weight to the field strength smaller than the predetermined reference value, as the field strength becomes smaller, to calculate the weighted field strength. These values are added for each communication route, so that a communication route having a greater additional value is selected.

Figure 15:
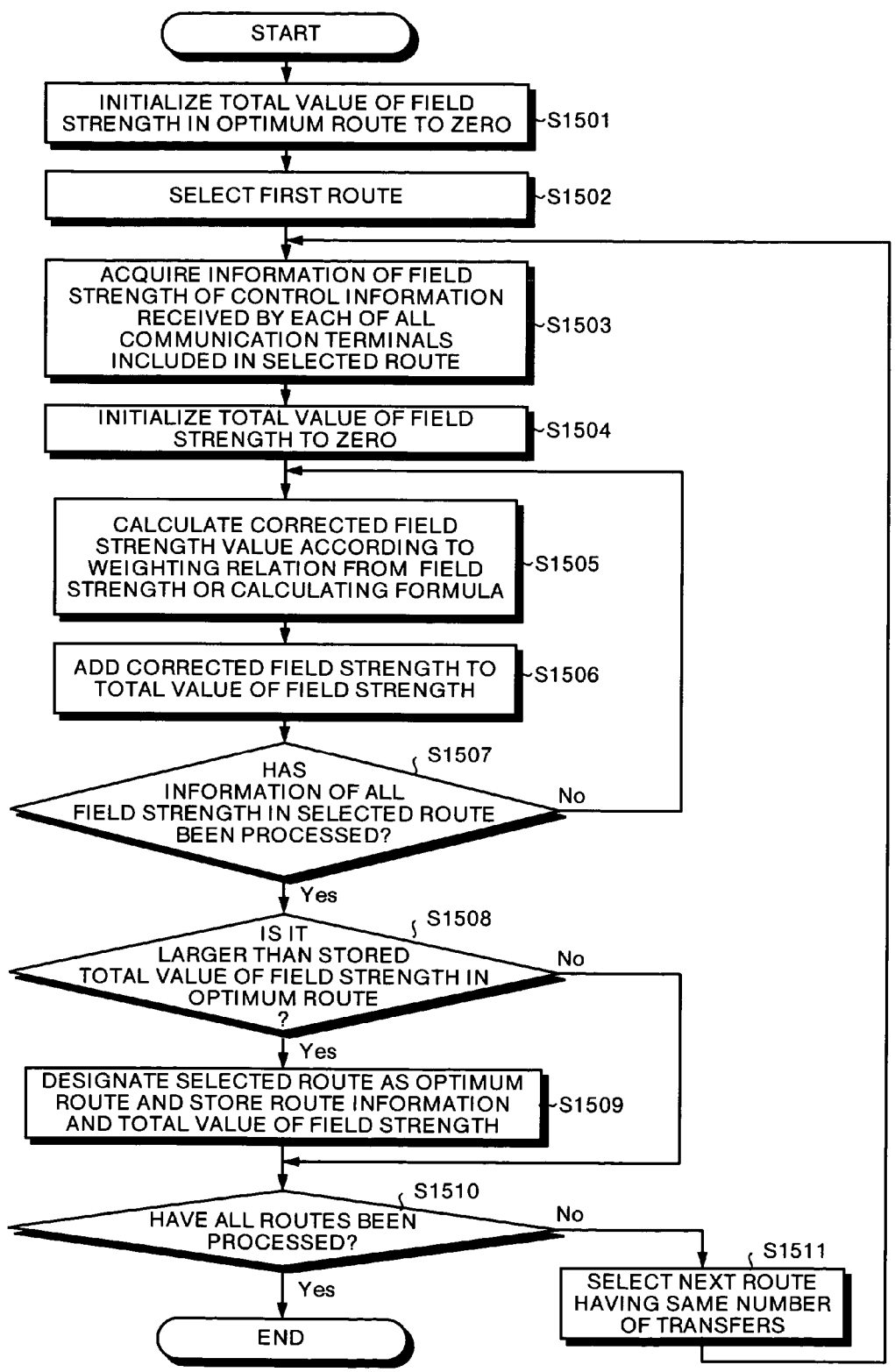
FIG. 15 is a flowchart for explaining a procedure for routing processing performed by the communication terminal based on information of a weighted received field strength.

A procedure for the routing processing will now be explained. FIG. 15 is a flowchart for explaining the procedure for routing processing performed by the communication terminal based on the information of the weighted field strength. The processing shown in FIG. 15 is a modification example of the processing shown in FIGS. 9 and 14.

As shown in FIG. 15, the routing table creation/update processor 15 initializes the total value of the field strength of the optimum route to zero (step S1501) for performing the routing processing. The routing table creation/update processor 15 then selects the first route (step S1502).

The routing table creation/update processor 15 acquires the information of the field strength of the control information received by each of all communication terminals included in the selected route (step S1503), and initializes the total value of the field strength to zero (step S1504).

Figure 16:
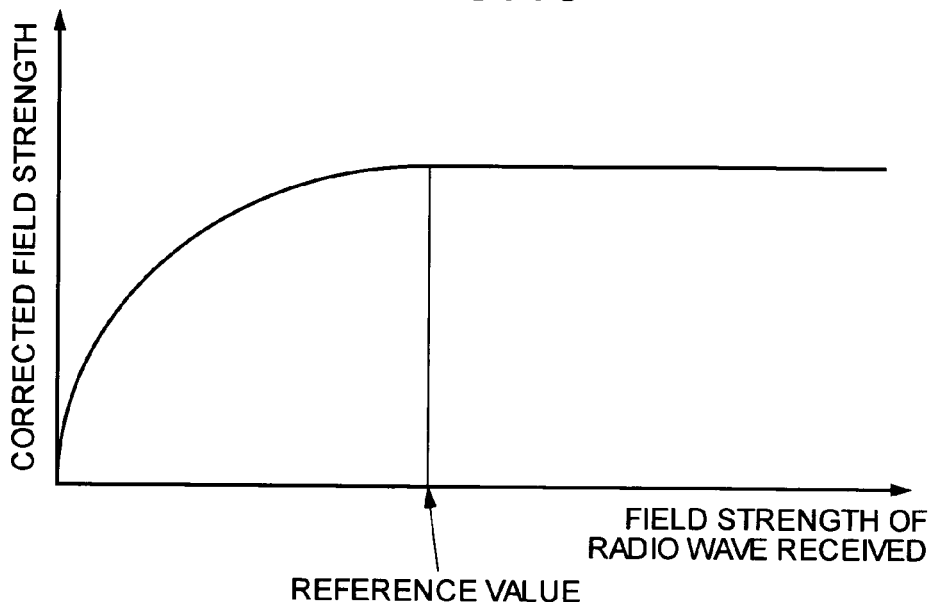
FIG. 16 is one example of the relation between a corrected field strength and the received field strength.

The routing table creation/update processor 15 calculates a corrected field strength according to the weighting relation between the corrected field strength and the field strength, as shown in FIG. 16, or a predetermined calculating formula (step S1505), to add the corrected field strength to the total value of the field strength (step S1506).

The routing table creation/update processor 15 then determines whether the information of field strength of all communication terminals in the selected route has been processed (step S1507). When the processing for the information of field strength of all communication terminals has not finished yet (step S1507, No), the routing table creation/update processor 15 proceeds to step S1505, to calculate the corrected field strength with respect to the field strength of an unprocessed communication terminal, to continue the subsequent processing.

At step S1507, when the processing for the information of field strength of all communication terminals has finished (step S1507, Yes), the routing table creation/update processor 15 determines whether the total value of the field strength is greater than the stored total value of the field strength in the optimum route (step S1508).

When the total value of the field strength is greater than the stored total value of the field strength in the optimum route (step S1508, Yes), the routing table creation/update processor 15 designates the route selected at step S1502 as the optimum route, to perform processing for storing the route information and the total value of the field strength (step S1509).

The routing table creation/update processor 15 determines whether all routes have been processed (step S1510), and when all routes have not been processed (step S1510, No), selects the next route having the same number of transfers (step S1511), and proceeds to step S1503, to continue the subsequent processing.

When all routes have been processed (step S1510, Yes), the routing table creation/update processor 15 finishes the routing processing. At step S1508, when the total value of the field strength is not greater than the stored total value of the field strength in the optimum route (step S1508, No), the routing table creation/update processor 15 proceeds to step S1510, to determine whether all routes have been processed.

In the first embodiment and the modification example of the first embodiment, the field strength of radio wave for the control information received by a certain communication terminal from another communication terminal is used as the field strength used for selection of the communication route. However, the accuracy of field strength may be improved by using a mean value of the field strength of the radio waves transmitted from the first communication terminal when the first communication terminal transmits the control information to the second communication terminal, and the field strength of the radio waves transmitted from the second communication terminal when the second communication terminal transmits the control information to the first communication terminal, as the field strength to be used for selection of the communication route.

Figure 17:
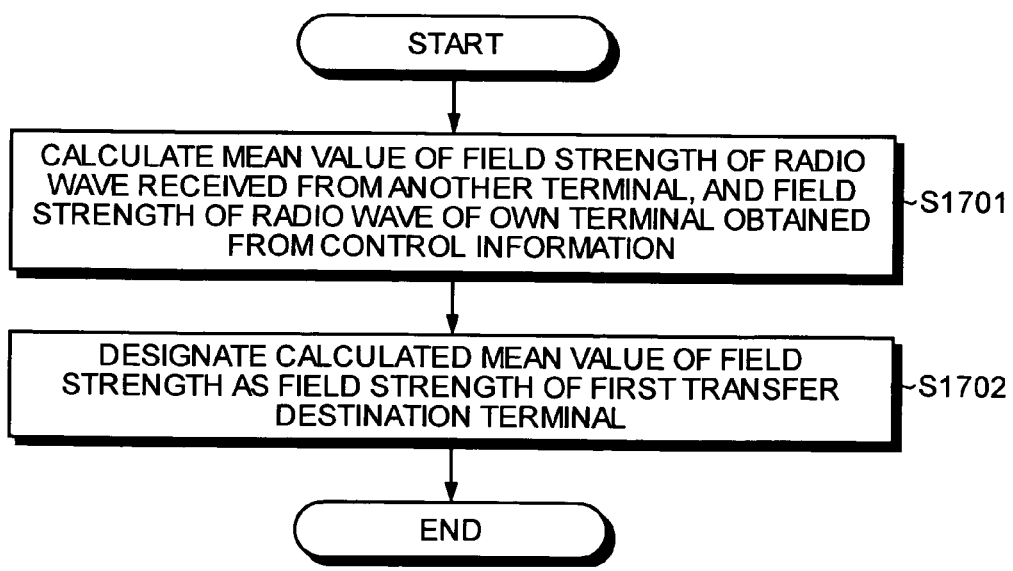
FIG. 17 is a flowchart for explaining a processing procedure for improving the accuracy of the field strength, using a mean value of the field strength.

The processing procedure for improving the accuracy of the field strength will be explained below. FIG. 17 is a flowchart for explaining the processing procedure for improving the accuracy of the field strength, using the mean value of the field strength.

The processing shown in FIG. 17 is a modification example of the processing shown in FIG. 8, such as an example explained in the first embodiment, wherein a data communication route is selected based on the information related to the field strength of the radio wave received by another communication terminal when the another communication terminal receives the radio wave transmitted by the own communication terminal, and the field strength of the radio wave received when the own communication terminal receives the radio wave transmitted by the other communication terminal.

However, the modification example is not limited to the case of the first embodiment, and may be applied when the field strength for the control information of all communication terminals included in the route to the destination terminal, to which the data is transmitted, is taken into consideration, or when the information of the weighted field strength is further taken into consideration, as described in the modification example.

In two communication terminals on the route to the destination terminal, to which the data is transmitted, the accuracy of field strength may be improved by calculating a mean value of the field strength of the radio wave received by the second communication terminal when the second communication terminal receives the radio wave transmitted from the first communication terminal, and the field strength of the radio wave received by the first communication terminal when the first communication terminal receives the radio wave transmitted from the second communication terminal.

As shown in FIG. 17, the field strength information acquiring unit 12 calculates a mean value of the field strength of radio wave received from another terminal and the field strength of radio wave of the own terminal acquired from the control information (step S1701). The field strength information acquiring unit 12 designates the calculated mean value of field strength as the field strength of the first transfer destination terminal (step S1702), to finish the accuracy improving processing.

The mean value calculated according to the processing procedure in FIG. 17 can be used not only for improving the accuracy of field strength, but also for the routing processing as shown in FIG. 9. That is, in FIG. 9, the sum of the field strength of radio wave received from another terminal and the field strength of radio wave of the own terminal is calculated (step S902), and when the sum is greater than the sum stored in the routing table 16a (step S902, Yes), a route having a greater sum of field strength is selected (step S904).

On the other hand, when the mean value is used, instead of the sum of field strength, a mean value of the field strength of radio wave received from another terminal and the field strength of radio wave of the own terminal is calculated, and when the mean value is greater than that stored in the routing table 16a, a route having a greater mean value may be selected as an optimum route.

As another method for improving the accuracy of field strength, the position information of the respective communication terminals may be used. The example in which the position information of the respective communication terminals is used will be explained in detail in the second embodiment.

In the modification example, the routing table creation/update processor 15 selects a communication route having a small number of transfers, when data is transferred by a communication terminal that relays the data to a communication terminal, being the destination terminal of the data, and when the number of transfers is the same between multiple communication routes, selects the data communication route based on the information related to the field strength of the radio waves received when the respective communication terminals constituting the respective communication routes receive the radio waves from other communication terminals. As a result, a route capable of stable wireless communication can be selected over the whole communication route.

In the modification example, the field strength information acquiring unit 12 calculates a mean value of the field strength of the radio wave received when the second communication terminal receives the radio wave transmitted from the first communication terminal, and the field strength of the radio wave received when the first communication terminal receives the radio wave transmitted from the second communication terminal, and the routing table creation/update processor 15 selects the data communication route based on the calculated mean value of the field strength.

In the first embodiment, when it is determined that the field strength for the control information diverges from the group in which the field strength is collected more than a predetermined number, the field strength is not used for the selection of the data transmission route. However, the field strength for the control information may be predicted from the position information of the communication terminal, and when an actually measured field strength diverges from the predicted value, the field strength may not be used for the selection of the data transmission route.

Therefore, in the second embodiment, the processing for improving the accuracy of the field strength, in which the accuracy of the actually measured field strength is determined based on the predicted value of the field strength for the control information, and the data transmission route is selected by using only the data of a highly accurate field strength, will be explained.

Figure 18:
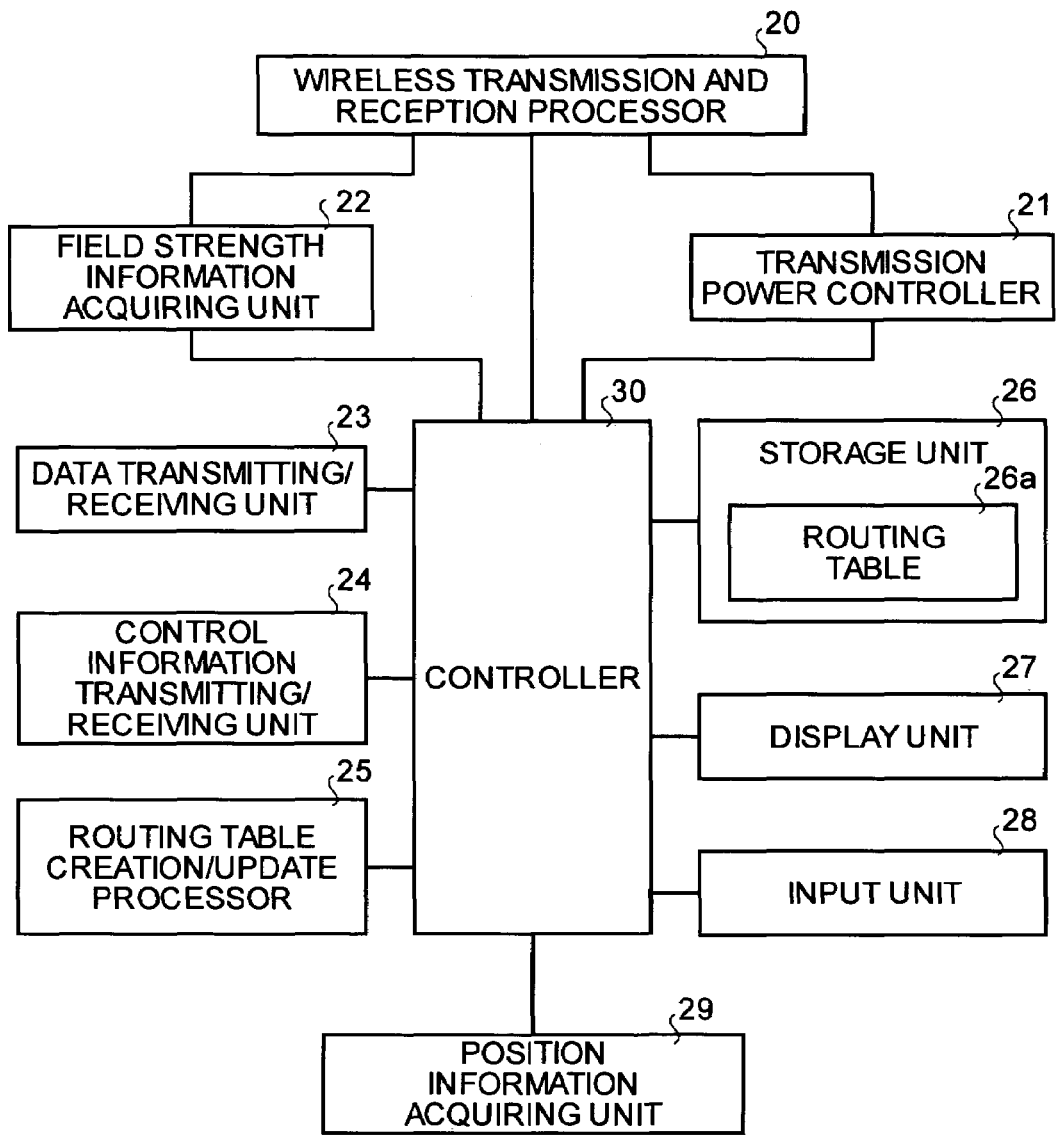
FIG. 18 is a block diagram of the functional configuration of the communication terminal according to a second embodiment.

The functional configuration of the communication terminal according to the second embodiment will be explained first. FIG. 18 is a block diagram of the functional configuration of the communication terminal according to the second embodiment. The functional unit having the same function as the communication terminal shown in FIG. 1 will not be explained in detail.

The communication terminal has a radio transfer processor 20, a transmission power controller 21, a field strength information acquiring unit 22, a data transmitting/receiving unit 23, a control information transmitting/receiving unit 24, a routing table creation/update processor 25, a storage unit 26, a display unit 27, an input unit 28, a position information acquiring unit 29, and a controller 30.

The radio transfer processor 20 performs processing for connecting the own terminal to the ad hoc network formed of multiple communication terminals, and transferring communication data and data such as control information between other communication terminals and the own communication terminal by radio.

The transmission power controller 21 performs processing for controlling the transmission power at the time of transmitting the data, based on the field strength of radio wave received from other communication terminals.

When having received radio wave including control information from other communication terminals, the field strength information acquiring unit 22 acquires information of the field strength of the radio wave received. The field strength information acquiring unit 22 also acquires information of the field strength of the radio waves received by another communication terminal when the another communication terminal receives the control information from other communication terminals.

The data transmitting/receiving unit 23 is a transmitting/receiving unit that transfers data to other communication terminals via the radio transfer processor 20. The control information transmitting/receiving unit 24 is a transmitting/receiving unit that transfers the control information for establishing a data transmission route via the radio transfer processor 20. The control information is transmitted from the respective communication terminals with certain transmission power.

The routing table creation/update processor 25 creates a routing table 26a stored in the storage unit 26, and updates the routing table 26a based on the received control information, the information of the field strength of the control information, and the position information of the communication terminal.

The routing table creation/update processor 25 selects an optimum communication route at the time of communicating the data, based on the information related to the field strength of the radio wave acquired by the field strength information acquiring unit 22, and the position information of the respective communication terminals acquired by the position information acquiring unit 28, and stores the information of the selected communication route in the storage unit 26.

The storage unit 26 is a storage device such as a semiconductor memory and a hard disk drive, and stores the routing table 26a in which the routing information related to the transmission route for transmitting the data is registered. The routing table 26a is the same as that shown in FIG. 3. The display unit 27 is a display device such as a liquid crystal display, and the input unit 28 is an input device such as a keyboard or a pen-type input unit.

The position information acquiring unit 29 is an acquiring unit that acquires the position information of the own communication terminal by using the global positioning system (GPS). The position information acquiring unit 29 performs processing for acquiring the position information of other communication apparatus included in the control information. The control information used in the second embodiment includes the position information of the sender terminal, in addition to the control information shown in FIG. 4. The controller 30 is a controller that controls the whole communication terminal.

Figure 19:
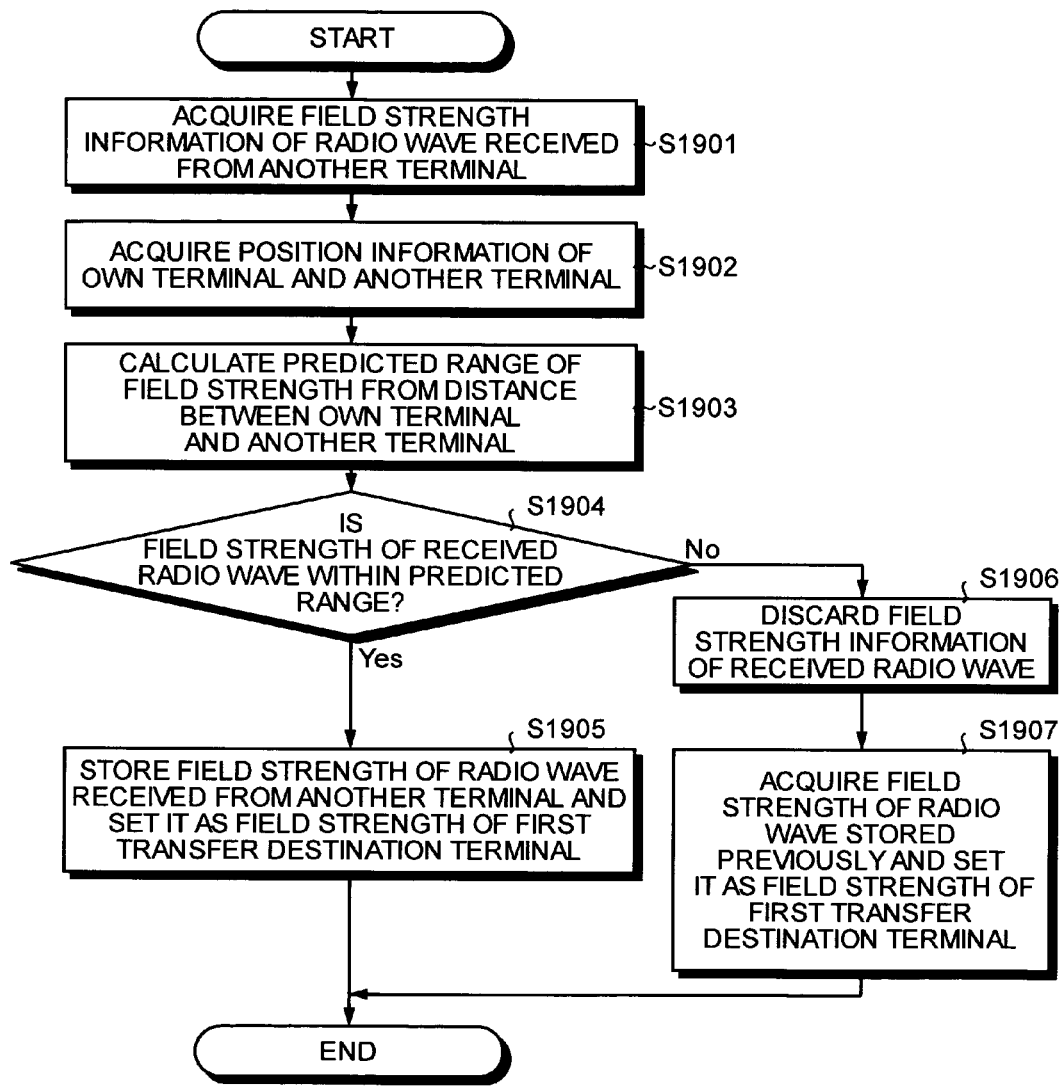
FIG. 19 is a flowchart for explaining a processing procedure for improving the accuracy of the field strength according to the second embodiment.

The detailed processing procedure for improving the accuracy of the field strength according to the second embodiment will be explained. FIG. 19 is a flowchart for explaining the processing procedure for improving the accuracy of the field strength according to the second embodiment. The processing for improving the accuracy of the field strength shown in FIG. 19 corresponds to the processing for improving the accuracy of the field strength shown in FIG. 8.

As shown in FIG. 19, the field strength information acquiring unit 22 in the communication terminal acquires the field strength information of radio wave received from another communication terminal (step S1901). The position information acquiring unit 29 acquires the position information of the own communication terminal, and the position information of other communication terminal from the control information (step S1902).

The field strength information acquiring unit 22 calculates a predicted value for the field strength of the control information to be received by the own communication terminal from the other communication terminal and an error range of the predicted value from the distance between the own communication terminal and the other communication terminal, by using a predetermined calculating formula (step S1903).

Subsequently, the field strength information acquiring unit 22 checks if the field strength of radio wave for the control information received from the other communication terminal is within a predicted range calculated by the predetermined calculating formula (step S1904).

When it is not within the predicted range (step S1904, No), the field strength information acquiring unit 22 discards the field strength information of radio wave received from the other communication terminal (step S1906), acquires the field strength information of radio wave stored previously for using it for the subsequent routing, and sets the acquired field strength as the field strength of the first transfer destination terminal (step S1907), to continue the subsequent processing, as shown in FIG. 9.

The field strength information of radio wave stored previously is acquired for using it for routing, but a predicted field strength calculated by the predetermined calculating formula may be used for the subsequent routing.

When the field strength of radio wave for the received control information is within the predicted range (step S1904, Yes), the field strength information acquiring unit 22 stores the field strength information of the radio wave received from the other communication terminal and sets the field strength of the received radio wave as the field strength of the first transfer destination terminal (step S1905), to continue the subsequent processing, as shown in FIG. 9.

In the second embodiment, the position information acquiring unit 29 acquires the position information of the own communication terminal and the other communication terminals, and the field strength information acquiring unit 22 calculates a predicted range of the field strength of radio wave received from other communication terminals, based on the acquired position information. When it is determined from the calculated predicted range that the field strength of radio wave is outside the range, the routing table creation/update processor 25 excludes the information related to the field strength determined to be outside the predicted range, to select the data communication route. Therefore, by excluding the information of an abnormal field strength, the route for the wireless communication can be selected accurately.

The exemplary embodiments of the present invention have been explained so far. However, specific configuration examples of the invention are not limited by the embodiments, and the present invention also includes modifications in design falling within the scope of the invention.

For example, a program for realizing the respective functions of the communication terminal may be recorded in a computer readable recording medium, and the program recorded in the recording medium may be read into the computer for execution, thereby realizing the respective functions.

Figure 20:
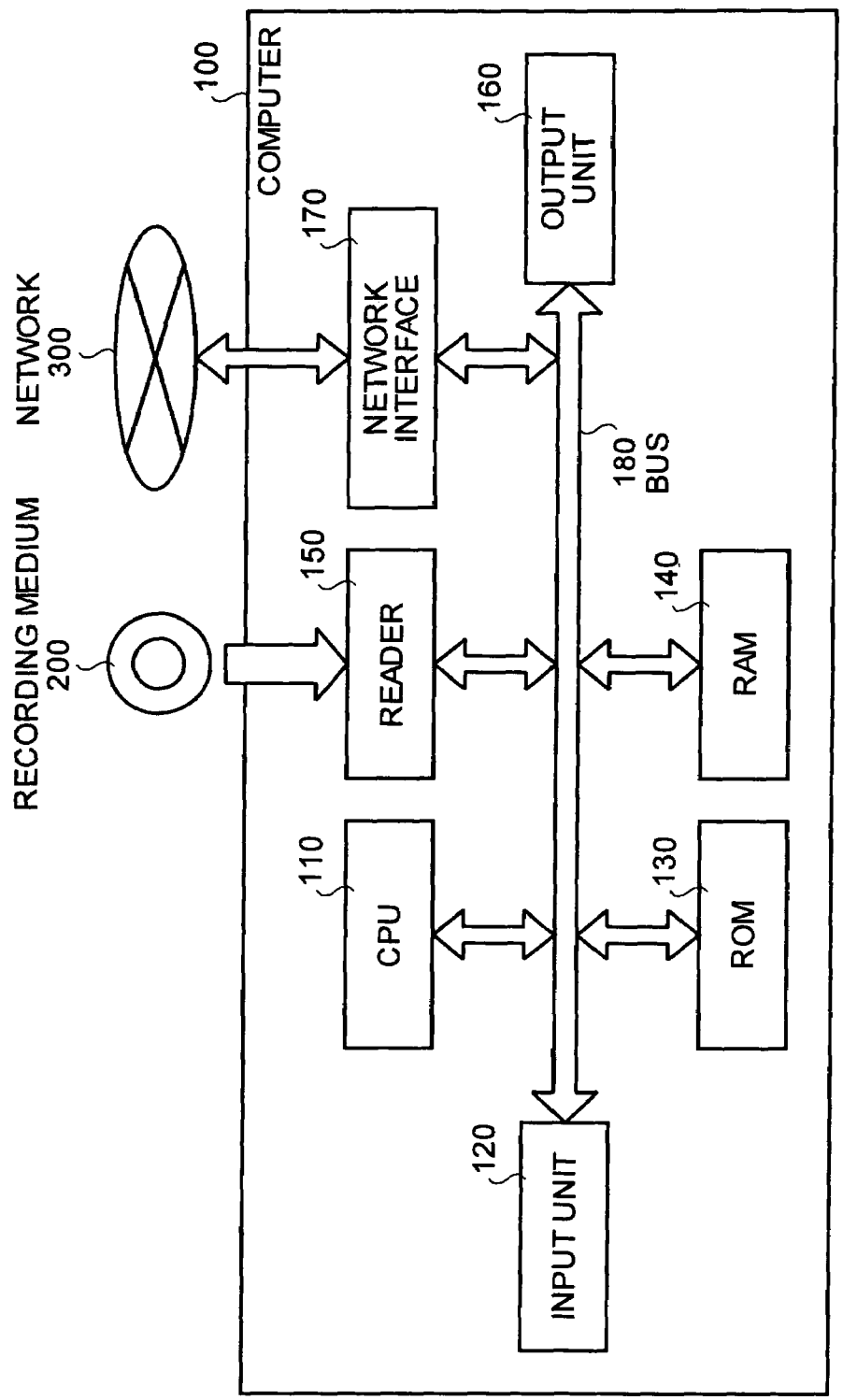
FIG. 20 is a block diagram of the hardware configuration of a computer realizing respective functions of the communication terminal.

FIG. 20 is a block diagram of the hardware configuration of a computer 100 for realizing the respective functions of the communication terminal. As shown in FIG. 20, the computer 100 has a configuration such that a central processing unit (CPU) 110 that executes the program, an input unit 120 such as a keyboard or a pen-type input unit, a read only memory (ROM) 130 that stores various kinds of data, a random access memory (RAM) 140 that stores arithmetic parameters, a reader 150 that reads the program from a recording medium 200 that stores the program for realizing the functions of the communication terminal, an output unit 160 such as a liquid crystal display, and a network interface 170 for the data transfer between the computer and other computers via a network 300 are connected by a bus 180.

The CPU 110 reads the program stored in the recording medium 200 via the reader 150 and executes the program, to realize the functions. The recording medium 200 includes an optical disk, a semiconductor disk, a magnetic disk, and the like. The program may be introduced to the computer 100 via the network 300.

Among the respective processing explained in the embodiments, all or a part of the processing explained as being performed automatically may be performed manually, or all or a part of the processing explained as being performed manually may be performed automatically in a known method. The information including the processing procedure, the control procedure, specific names, and various kinds of data and parameters shown in the data or in the drawing can be optionally changed, unless otherwise specified.

The respective constituents of the illustrated apparatus are functionally conceptual, and the physically same configuration is not always necessary. In other words, the specific mode of dispersion and integration of the apparatus is not limited to the illustrated one, and all or a part thereof may be functionally or physically dispersed or integrated in an optional unit, according to the various kinds of load and the status of use.

All or an optional part of the various processing functions performed by the apparatus can be realized by the CPU or a program analyzed and executed by the CPU, or can be realized as hardware by the wired logic.

According to the present invention, the information related to the field strength of radio wave is acquired, a data communication route is selected based on the information of the acquired field strength, and the information related to the selected data communication route is stored. As a result, even when multiple data communication routes exist, an optimum data communication route can be selected.

According to the present invention, it is determined whether the acquired field strength of radio wave is smaller than a predetermined threshold. When it is determined that the field strength of radio wave is smaller than the predetermined threshold, the information related to the field strength of radio wave is excluded, to select the data communication route. By excluding a communication terminal having weak field strength of radio wave, a stable wireless communication route can be selected.

According to the present invention, when data is transmitted based on the information related to the stored data communication route, the data transmission power is controlled based on the information related to the acquired field strength of radio wave. Therefore, when the field strength of radio wave of another communication terminal is large, the data transmission power with respect to the communication terminal is weakened, thereby reducing the congestion in communication, and enabling power saving for the communication terminal.

According to the present invention, a communication terminal having a small number of transfers when data is transferred by a communication terminal that relays the data to a communication terminal, being the destination terminal of the data, is selected as the data communication route. When multiple communication routes have the same number of transfers, the data communication route is selected based on the information related to the field strength of the radio wave received by another communication terminal when the another communication terminal receives the radio wave transmitted by the own communication terminal, and the field strength of the radio wave received when the own communication terminal receives the radio wave transmitted by the another communication terminal. As a result, a stable wireless communication route can be selected.

According to the present invention, a communication terminal having a small number of transfers, when data is transferred by a communication terminal that relays the data to a communication terminal, being the destination terminal of the data, is selected as the data communication route. When multiple communication routes have the same number of transfers, the data communication route is selected, based on the information related to the field strength of the radio waves received, when the respective communication terminals constituting the respective communication routes receive the radio waves from other communication terminals. As a result, a route capable of stable wireless communication over the whole communication route can be selected.

According to the present invention, a mean value of the field strength of the radio wave received by the second communication terminal when the second communication terminal receives the radio wave transmitted by the first communication terminal, and the field strength the radio wave received by the first communication terminal when the first communication terminal receives the radio wave transmitted from the second communication terminal is calculated, to select a data communication route based on the calculated mean value of the field strength. As a result, a stable wireless communication route can be selected accurately.

According to the present invention, when it is determined that the field strength of the radio wave departs from a predetermined range, the information related to the field strength determined to be outside the predetermined range is excluded, to select the data communication route. As a result, by excluding the information of abnormal field strength, the wireless communication route can be selected highly accurately.

According to the present invention, the predetermined range is a range determined based on the field strength of radio wave transmitted a plurality of times by the same communication terminal. As a result, the wireless communication route can be selected highly accurately, from the comparison with the field strength of radio wave transmitted a plurality of times by the same communication terminal.

According to the present invention, the position information of the own communication terminal and other communication terminals is acquired, and the predetermined range is a predicted range of the field strength of radio wave received from other communication terminals, predicted based on the acquired position information. As a result, the wireless communication route can be selected highly accurately, from the comparison with the field strength of radio wave predicted from the position information of communication terminals.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication terminal comprising:
an acquiring unit configured to acquire information related to a strength of a radio wave received; and a selecting unit configured to select a data communication route based on the information acquired by the acquiring unit, wherein the communication terminal is configured to perform wireless communication based on the information related to the data communication route, wherein the selecting unit is configured to select a communication route having a smallest number of transfers through which data is transferred by communication terminals which relay the data to a destination communication terminal, and select the data communication route, if a plurality of communication routes have the smallest number of transfers, based on information related to strengths of radio waves received by other communication terminals from the communication terminal, and strengths of radio waves received by the communication terminal from the other communication terminals.

2. The communication terminal according to claim 1, wherein the selecting unit is configured to determine whether the strength in the information acquired by the acquiring unit is less than a threshold, and to select the data communication route excluding the information related to the strength if the strength is determined to be less than the threshold.

3. The communication terminal according to claim 1, further comprising a controller configured to control data transmission strength based on the information related to the strength acquired by the acquiring unit, when data is transmitted based on the information related to the data communication route.

4. The communication terminal according to claim 1, wherein the selecting unit is configured to select a communication route having a smallest number of transfers through which data is transferred by communication terminals which relay the data to a destination communication terminal, and select the data communication route, if a plurality of communication routes have the smallest number of transfers, based on information related to a strength of a radio wave received by each of the communication terminals included in each of the plurality of communication routes from another of the communication terminals included in the each of the plurality of communication routes.

5. The communication terminal according to claim 1, wherein the selecting unit is configured to calculate a mean value of a strength of a radio wave received by a first communication terminal from a second communication terminal and a strength of a radio wave received by the second communication terminal from the first communication terminal, to select the data communication route based on the mean value calculated.

6. The communication terminal according to claim 1, wherein the selecting unit is configured to select the data communication route excluding the information related to the strength, if the strength is determined to be outside a predetermined range.

7. The communication terminal according to claim 6, wherein the predetermined range is a range determined based on strengths of a radio wave received a plurality of times from a same communication terminal.

8. The communication terminal according to claim 6, further comprising a position information acquiring unit configured to acquire position information of the communication terminal and another communication terminal, wherein the predetermined range is a range of strength of a radio wave to be received by the communication terminal from the another communication terminal, the range having been predicted based on the position information acquired by the position information acquiring unit.

9. A computer program product for performing wireless communication, including computer executable instructions stored on a computer readable medium, wherein the instructions, when executed by a computer, cause the computer to perform:

acquiring information related to a strength of a radio wave received;

selecting a data communication route based on the information acquired; and performing wireless communication based on the information related to the data communication route, the selecting a data communication step further comprising:

selecting the data communication route having a smallest number of transfers through which data is transferred by communication terminals which relay the data to a destination communication terminal, and selecting the data communication route, if a plurality of communication routes have the smallest number of transfers, based on information related to strengths of radio waves received by other communication terminals from the communication terminal, and strengths of radio waves received by the communication terminal from the other communication terminals.

10. A communication terminal comprising:

an acquiring unit configured to acquire information related to a strength of a radio wave received; and a selecting unit configured to select a data communication route based on the information acquired by the acquiring unit, wherein the communication terminal is configured to perform wireless communication based on the information related to the data communication route, wherein the selecting unit is configured to select a communication route having a smallest number of transfers through which data is transferred by communication terminals which relay the data to a destination communication terminal, and select the data communication route, if a plurality of communication routes have the smallest number of transfers, based on information related to a strength of a radio wave received by each of the communication terminals included in each of the plurality of communication routes from another of the communication terminals included in the each of the plurality of communication routes.

11. A computer program product for performing wireless communication, including computer executable instructions stored on a computer readable medium, wherein the instructions, when executed by a computer, cause the computer to perform:

acquiring information related to a strength of a radio wave received;

selecting a data communication route based on the information acquired; and performing wireless communication based on the information related to the data communication route, the selecting a data communication route step further comprising:

selecting the data communication route having a smallest number of transfers through which data is transferred by communication terminals which relay the data to a destination communication terminal, and selecting the data communication route, if a plurality of communication routes have the smallest number of transfers, based on information related to a strength of a radio wave received by each of the communication terminals included in each of the plurality of communication routes from another of the communication terminals included in the each of the plurality of communication routes.

* * * * *